United States Patent
Douglas

(10) Patent No.: US 7,152,242 B2
(45) Date of Patent: Dec. 19, 2006

(54) MODULAR SYSTEM FOR DETECTING, FILTERING AND PROVIDING NOTICE ABOUT ATTACK EVENTS ASSOCIATED WITH NETWORK SECURITY

(75) Inventor: Kevin Douglas, Vienna, VA (US)

(73) Assignee: Enterasys Networks, Inc., Andover, MA (US)

( * ) Notice: Subject to any disclaimer, the term of this patent is extended or adjusted under 35 U.S.C. 154(b) by 909 days.

(21) Appl. No.: 10/241,145

(22) Filed: Sep. 11, 2002

(65) Prior Publication Data

US 2004/0049693 A1 Mar. 11, 2004

(51) Int. Cl.
*H04L 9/00* (2006.01)
*G06F 11/00* (2006.01)
*G06F 15/173* (2006.01)

(52) U.S. Cl. .............................. 726/23; 726/24; 726/13; 709/223; 709/224; 705/51

(58) Field of Classification Search ..................... None
See application file for complete search history.

(56) References Cited

U.S. PATENT DOCUMENTS 6,801,940 B1 * 10/2004 Moran et al. ............... 709/224

| | | | |
|---|---|---|---|
| 2002/0078382 A1 * | 6/2002 | Sheikh et al. | 713/201 |
| 2002/0143938 A1 * | 10/2002 | Alexander et al. | 709/224 |
| 2004/0008652 A1 * | 1/2004 | Tanzella et al. | 370/338 |
| 2004/0030912 A1 * | 2/2004 | Merkle et al. | 713/200 |

* cited by examiner

*Primary Examiner*—Gilberto Barron
*Assistant Examiner*—Abdulhakim Nobahar
(74) *Attorney, Agent, or Firm*—Caesar, Rivise, Bernstein, Cohen & Pokotilow, Ltd.

(57) ABSTRACT

A host-based intrusion detection system (HIDS) sensor that monitors system logs for evidence of malicious or suspicious application activity running in real time and monitors key system files for evidence of tampering. This system detects attacks targeted at the host system on which it is installed and monitors output to the system and audit logs. It is signature-based and identifies and analyzes system and audit messages for signs of system misuse or attack. The system monitors the logs of applications running on the host, including mail servers, web servers and FTP servers. The system also monitors system files and notifies the system administrator when key system and security files have been accessed, modified or even deleted.

24 Claims, 21 Drawing Sheets

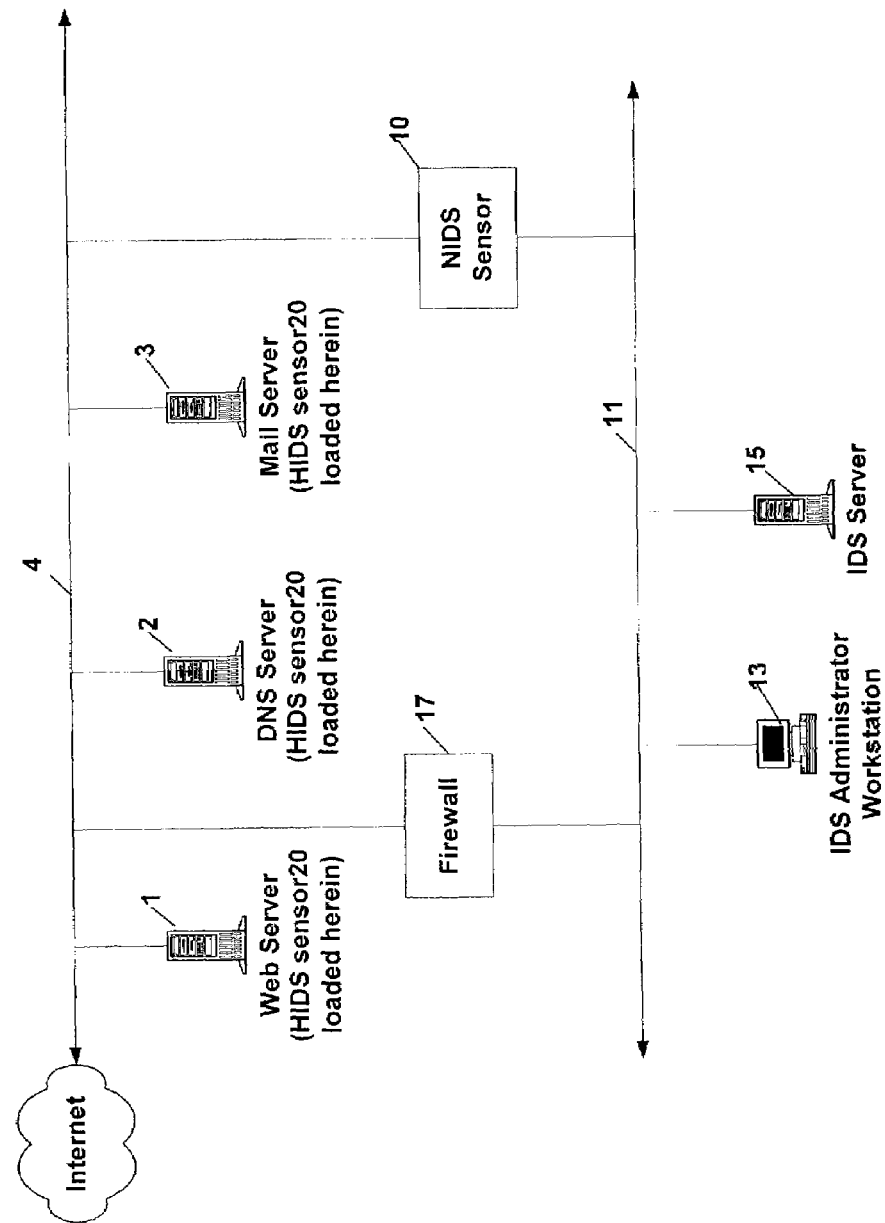

FIG. 3

| Token | Description |
|---|---|
| %s | Variable length string terminated by space ('ABC '). Trailing space (and any subsequent spaces) is discarded. |
| %C | Variable length string terminated by a colon ('ABC DEF:'). Trailing colon (and any subsequent spaces) is discarded. |
| %E | Variable length string terminated by newline ('ABC DEF\n'). Trailing newline is discarded. This token can be useful to describe an entire record as one large field when individual field parsing is not necessary. |
| %Q | Variable length string enclosed with quotes ('"ABC DEF"'). Leading and trailing quote (and any subsequent spaces) is discarded. Please note that previously the leading quote was included in the parsed field. |
| %B | Variable length string enclosed with brackets ('[ABC DEF]'). Leading left bracket is omitted from the parsed field. Trailing right bracket (and any subsequent spaces) is discarded. Please note that previously the leading left bracket was included in the parsed field. |
| %P | Variable length string enclosed with parenthesis ('(ABC DEF)'). Leading and trailing right parenthesis (and any subsequent spaces) is discarded. Please note that previously the leading left parenthesis was included in the parsed field. |
| %n | Variable length numeric value (terminated by space or first nonnumeric character). |
| %i | IP Address in dotted quad format (e.g., 127.0.0.1) (terminated by white space or first nonnumeric character). |
| %T | Military Time (HH:MM:SS). |
| %t | Military Date/Time (Mon DD %T) (May 7 12:12:53). |

FIG. 4

| Token | Description |
|---|---|
| %40s | fixed length string (e.g., 40 bytes) |
| %c | 1 byte (similar to %1s) |

Search Clause Format:

| Search Clause #1 | | | Search Clause #2 | | |
|---|---|---|---|---|---|
| comparison operator | field number | search string | comparison operator | field number | search string |

,

Example:

| ~ | %5: | get%20/2fcgi-bin/2fphf | ! | %6: | 404 |

| Operator | Description |
|---|---|
| ~ | String Search. Test the field number to check if the character sequence is contained in the field. This is the default setting if not operator is specified. |
| = | Numeric Equality. Test the field number specified for numeric equality with the character sequence. |
| > | Numeric Greater Than. Test the field number to check of it is numerically greater than the character sequence. |
| < | Numeric Less Than. Test the field number to check if it is numerically less than the character sequence. |
| ! | String Not Equal. Test the field number to check if the character sequence is NOT contained in the field. |

FIG. 8

| Attribute Name | Description |
|---|---|
| ModuleName | Specifies the full pathname to a dynamically linked EDE, EAE or EFE Squire module. This attribute is only used for dynamically linked modules. File paths will be expanded to resolve environment variables. For example, "%WINDIR%\modules\mymodule.dll" will be expanded to "C:\WINNT\modules\mymodule.dll" |
| Command | For 'wrapped' modules, the module name is specified by listing the command to be run by Squire. For example, if a perl script Squiremodule is developed (e.g., myscript.pl), it would be specified as '/tmp/myscript.pl'. |
| Identifier | Each module can be given an identifier. The identifier is provided to the module as it is initialized. This can be useful to allow a module to differentiate itself from instance to instance. The identifier is also automatically added to each line item in logs files as they are generated. |
| ModuleType | Identifies the type of dynamically linked module. This value must be set to *dll* for Windows dynamically linked libraries and *so* for Unix dynamic shared objects. |
| InitializeFunctionName | In dynamically linked libraries, this specifies the function name that should be invoked by Squire as the module is initialized. The specified function will receive all configuration information defined in the dsquire.cfg file for the module as well as pointers to callback functions for recording events and logging debug information. |
| ProcessFunctionName | In dynamically linked libraries, this specifies the function name that should be invoked by Squire to begin processing.<br><br>For EDE (detection) modules, Squire calls this function and then allows the module to run at will to generate events.<br><br>In EFE (filtering) modules, this function is called each time an event has been received by an EDE module. The EAE module examines the event and either ignores it, changes data in the event or instructs Squire to discard the event.<br><br>In EAE (alerting) modules, this function is called each time an event has successfully passed through the last configured EFE module. The EAE module receives the event and can do with it what it wishes. |
| TerminateFunctionName | In dynamically linked libraries, this specifies the function name that should be invoked as Squire terminates. This is intended to allow the module developer to perform clean up prior to terminating. |
| ConfigFile | This is a convenience attribute that allows a config file name to be specified and provided to the Squire module during initialization. It is the module's responsibility to use the config file name to parse the designated configuration file.<br><br>File paths will be expanded to resolve environment variables. For example, "%WINDIR%\conf\myconfig.cfg" will be expanded to "C:\WINNT\conf\myconfig.cfg" |
| MaxNumErrors | For persistent modules, this specifies the maximum number of times that the module can die before it is disabled by Squire. This attribute should be omitted for scheduled modules since they are expected to terminate at fixed intervals. |
| Enabled | Set this value to *TRUE* to enable the module or *FALSE* to disable the |

FIG. 9A

| | |
|---|---|
| | module. Squire will only run enabled modules. This allows module definitions to be preserved while modules are disabled. |
| Version | Indicates the Squire version for which the module was written. Initially, the version should be set to *1*. As Squire evolves, the version number will increment and the event formats may change. By specifying a version number, Squire will be able to retain backward compatibility with modules. This will prevent module developers from being required to upgrade their modules immediately as new releases of Squire are available. |
| Debug | This flag can be set to TRUE or FALSE in the configuration file for each module. The value of this attribute will be made available to each module during initialization to allow a module to decide whether or not to generate debug output. |
| Schedule | A module can be persistent (never terminates) or scheduled (terminates and is restarted periodically). The *Schedule* attribute indicates how often (in seconds) to start the module. Modules will only be restarted if the previous instance has terminated. Omit this attribute for persistent modules. |
| EventFormat | For wrapped modules, the *EventFormat* specifies the format of events as they are passed between the module and the Squire engines. For example, a wrapped EDE module would specify an *EventFormat* and then write events in the designated format to stdout as they occur. Squire would use the format to parse the data fields. Each field in the event should be seperated with a '|' field seperator. Valid format tokens are listed in figure 10. |

FIG. 9B

| Attribute | Description |
|---|---|
| %T | EVENT TIME<br>The date/time of the event in a YYYY-MM-DD HH:MM:SS format. If an EDE module sets the field to a single space (e.g., ' '), Squire will timestamp the event to the current time. |
| %N | SENSOR NAME<br>The name of the sensor that generated the event. If an EDE module sets the field to a single space (e.g., ' '), Squire will fill in the sensor name with the name specified by *SensorName* in the *dsquire.cfg* configuration file. |
| %E | EVENT NAME<br>The name of the event generated. Event names may not contain any embedded spaces. An example of an event name used by Squire is *APACHE:SHUTDOWN*. Event names can be created by the user by defining the event/signature in the Dragon Policy Manager. Once defined, any events generated by a module will be tied to the event description as the event is displayed via the reporting tools. If an event name is not defined in the Dragon Policy Manager, the events will still display via the reporting tools. However, event descriptions will not be available. |
| %S | SIP<br>Source IP address in dotted quad format (e.g., 127.0.0.1) |
| %D | DIP<br>Destination address IP in dotted quad format (e.g., 127.0.0.1) |
| %G | SOURCE PORT<br>Source Port Number (e.g., 9118) |
| %H | DESTINATION PORT<br>Destination Port Number (e.g., 80) |
| %B | TRAFFIC DIRECTION<br>(I = Internal Protected Net, X = External Protected Net, T = To Protected Net, F = From Protected Net) |
| %A | ALARM DATA<br>This is a one-line synopsis/header for the event. Currently, the alarm data is displayed in tools such as mklog (list mode). No embedded spaces are allowed in the alarm data. |
| %X | PACKET/EVENT DATA<br>The packet event data can be considered alarm detail. This information is displayed in tools such as mklog (raw mode). The alarm data can only contain printable characters and cannot contain embedded newline characters. |

FIG. 10

```
Squire {

# Overall Squire Attributes.  These settings are not specific to
    # any one module.

SensorName       MySquireSensor    # Name of Squire Instance
    LogFileName      ./squire.log      # Name of log file for log output
    Debug            FALSE             # Debug enabled/disabled for Squire framework
    Daemonize        FALSE             # Run in background?
    RB_BufferSize    6144              # maximum event size in the ring buffer
    RB_NumElements   10                # number of events in the ring buffer
    HeartBeatRate    3600              # number of seconds between HEARTBEAT EventDetectionEngine {
        # (EDE) Modules run in parallel to feed the EFE.

AddInModules {

# The following is a sample of a dynamically linked module
            # that runs persistently.  Sample code for this type of module
            # can be found in ./modules-templates/EDE/squire-EDE-module.c SampleEDEModule {
                ModuleName              /home/kdouglas/DSO/myDSO.so
                Identifier              EDEModule1
                ModuleType              so
                InitializeFunctionName  initFuncName
                ProcessFunctionName     procFuncName
                TerminateFunctionName   termFuncName
                ConfigFile              /tmp/myconfigfile.cfg
                MaxNumErrors            999
                Enabled                 FALSE
                Version                 1
                Debug                   FALSE
            }

# The following is a sample of a dynamically linked module
            # that runs, terminates and is then restarted 60 seconds later
            # by Squire.  Sample code for this type of module can be found in
            # ./modules-templates/EDE/squire-EDE_module.c SampleEDEScheduledModule {
                ModuleName              /home/kdouglas/DSO/myDSO.so
                ModuleType              so
                Identifier              EDEModule2
                InitializeFunctionName  initFuncName
                ProcessFunctionName     procFuncName
                TerminateFunctionName   termFuncName
                ConfigFile              /usr/dragon/dragon.cfg
                Schedule                60
                Enabled                 FALSE
                Version                 1
                Debug                   FALSE
            }

# The following is a sample of a wrapped module that runs
            # persistently.  A warpped module uses stdout to pass events
            # to Squire and can be written any any scripting/programming
            # language.  Perl or C is a good choice for this type of module.
            # Sample Perl code can be found in
            # ./modules-templates/EDE/squire-EDE-script.pl SampleEDEScript {
                Command                 /tmp/myscript.pl
                Identifier              EDEModule3
                EventFormat             %T%N%E%S%D%G%H%B%A%X
```

FIG. 11A

```
            Enabled                   FALSE
            Version                   1
            MaxNumErrors              999
            Debug                     FALSE
        }

# The following is a sample of a wrapped module that runs once,
        # terminates and is restarted every 60 seconds by Squire.  Wrapped
        # modules use stdout to pass events to Squire and can be developed
        # in any programming language.  A sample Perl script can be found
        # in ./modules-templates/EDE/squire-EDE-scheduled-script.pl.

SampleEDEScheduledScript {
            Command                   /tmp/myscript.pl
            Identifier                EDEModule4
            EventFormat               %T%N%E%S%D%G%H%B%A%X
            Enabled                   FALSE
            Version                   1
            Schedule                  60
            Debug                     FALSE
        }
    }
}

EventFilterEngine {
    # (EFE) Modules run serially against events prior to the EAE.  These
    # modules are invoked from pfnRecordEvent()    Each EDE Module will
    # invoke the EFE modules in a seperate thread (as the result of calling
    # pfnRecordEvent callback function).  The EFE modules
    # are then run serially in the order presented below.

AddInModules {

# The following is a sample of a dynamically linked module
        # Sample code for this type of module can be found in
        # ./modules-templates/EFE/squire-EFE-module.c SampleEFEModule {
            ModuleName                /home/kdouglas/DSO/myDSO.so
            ModuleType                so
            Identifier                EFEModule1
            InitializeFunctionName    initFuncName
            ProcessFunctionName       procFuncName
            TerminateFunctionName     termFuncName
            ConfigFile                /tmp/myconfigfile.cfg
            MaxNumErrors              999
            Enabled                   FALSE
            Version                   1
            Debug                     FALSE
        }

# The following is a sample of a wrapped module.  Wrapped
        # modules use stdin and stdout to pass events between Squire.
        # Squire will pass an event to the filter module based on the
        # format specified by 'EventFormat'.  The module will then
        # alter contents of the event and print the results to stdout
        # adhering to the 'EventFormat'.  Please note that all fields
        # must be passed in and out of the filter module (the order of the
        # fields is flexible using 'EventFormat').  Otherwise, the omitted
        # fields will be blanked out.  A sample Perl script can be found
        # in ./modules-templates/EFE/squire-EFE-script.pl.

SampleEFEScript {
            Command                   /tmp/myscript.pl
            Identifier                EFEModule2
            EventFormat               %T%N%E%S%D%G%H%B%A%X
            Enabled                   FALSE
            Version                   1
            MaxNumErrors              999
            Debug                     FALSE
        }
```

EventAlertingEngine {
    # (EAE) Modules run in parallel to alert events

AddInModules {

# The following is a sample of a dynamically linked module
        # Sample code for this type of module can be found in
        # ./modules-templates/EAE/squire-EAE-module.c SampleEAEModule {
            ModuleName              /home/kdouglas/DSO/myDSO.so
            ModuleType              so
            Identifier              EAEModule1
            InitializeFunctionName  initFuncName
            ProcessFunctionName     procFuncName
            TerminateFunctionName   termFuncName
            ConfigFile              /tmp/myconfigfile.cfg
            MaxNumErrors            999
            Enabled                 FALSE
            Version                 1
            Debug                   FALSE
        }

# The following is a sample of a wrapped module.  Wrapped
        # modules use stdin to receive events from Squire.
        # Squire will pass an event to the alerting module based on the
        # format specified by 'EventFormat'.  A sample Perl script can
        # be found in ./modules-templates/EAE/squire-EAE-script.pl.

SampleEAEScript {
            Command                 /tmp/myscript.pl
            Identifier              EAEModule2
            EventFormat             %T%N%E%S%D%G%H%B%A%X
            Enabled                 FALSE
            Version                 1
            MaxNumErrors            999
            Debug                   FALSE
        }
    }
}
}
```

FIG. 11C

```
#================================================================================
# File: dsquire.net

#     Copyright (C) Enterasys Networks 2001, 2002
#================================================================================
NAME=basiliskHIDS

#================================================================================
# Sleep Intervals - Length of time (seconds) between Checking Resources for activity

# SLEEP_SECONDS:        Indicates the number of seconds to pause between checking file
#                       attributes
# SLEEP_SECONDS_REGISTRY: Indicates the number of seconds to pause between checking the
#                       Windows Registry for changes.
# SLEEP_SECONDS_LOG:
# MD5_SERVER_RATE: Indicates how often to send MD5 Reference events to the EPP for
#                  off-machine MD5 storage/detection.
#================================================================================
SLEEP_SECONDS=1
SLEEP_SECONDS_REGISTRY=1
SLEEP_SECONDS_LOG=1
SLEEP_SECONDS_EVENTLOG=1
MD5_RATE=60
MD5_SERVER_RATE=60

MAX_NUMBER_UNCHANGED=30

#================================================================================
# SNMP Trap Alerts - Used by the SNMP ALerting Modules to forward traps for each event

# UnComment these lines to Start generating traps

# SNMP_OID:             OID Value to be set in the generated trap
# SNMP_COMMUNITY_STRING Community String to be set in generated trap
# SNMP_AGENT_IP:        Agent IP Address to be set in generated trap
# SNMP_SERVER_IP:       Target IP Address for generated trap
# SNMP_PORT:            Target Port on SNMP_SERVER_IP
#================================================================================
#SNMP_OID=1.3.6.1.4.1.4471
SNMP_COMMUNITY_STRING=public
#SNMP_AGENT_IP=127.0.0.1
#SNMP_SERVER_IP=127.0.0.1
#SNMP_PORT=162

#================================================================================
# Resource Definitions

# Available Attributes are as follows:

# FILE_NAME:       Name of Resource - Used to tie signatures in dsquire.sigs
#                  to resource definition
# DISABLED:        Y/N to indicate if Squire should process this resource.
# FILE_TYPE:       Type of Resource (F = Disk File, S = Inbound SNMP Trap,
#                  E = Windows Event Log, R = Windows Registry)
# FILE_PATH:       Path of Resource (FILE_TYPE=F Resources)
# FILE_LOGNAME:    Windows Event Log Name (e.g., Application, Security or System)
#                  (e.g., FILE_LOGNAME=Application)
# FILE_HIVE:       Hive Name in Windows Registry (e.g., HKLM)
# FILE_KEYNAME:    Key Name in Windows Registry
# FILE_SNMP_OID:   SNMP OID Value for SNMP Trap resources.  May be left blank
#                  to match all OID Values
# FILE_SNMP_SIP:   Comma seperated list of Source IP Address/CIDR Block for SNMP
#                  Trap Resources.
#                  May be left blank to match all Source IP Addresses.
#                  (e.g., FILE_SNMP_SIP=10.100.100.125,110.0.0.0/8)
```

FIG. 12A

```
# FILE_SNMP_SIP_TYPE:  In version 1 SNMP Traps, the Source IP Address is contained
#                      within the SNMP Trap.  This attribute
#                      is used to indicate if the actual IP address from the UDP
#                      packet or the IP address within the SNMP trap should be used
#                      for the FILE_SNMP_SIP comparison (U = UDP, S = SNMP).
# FILE_MODIFIER:       Indicates a 'special file'  Special Files include:
#                      1  - IIS NCSA Hourly Log
#                      2  - IIS NCSA Daily Log
#                      3  - IIS NCSA Weekly Log
#                      4  - IIS NCSA Monthly Log
#                      5  - IIS NCSA Unlimited Log
#                      11 - Microsoft IIS Hourly Log
#                      12 - Microsoft IIS Daily Log
#                      13 - Microsoft IIS Weekly Log
#                      14 - Microsoft IIS Monthly Log
#                      15 - Microsoft IIS Unlimited Log
#                      21 - W3C Extended Hourly Log
#                      22 - W3C Extended Daily Log
#                      23 - W3C Extended Weekly Log
#                      24 - W3C Extended Monthly Log
#                      25 - W3C Extended Unlimited Log

# FILE_FORMAT:         Record Format for Records within the Resource.  Used for
#                      identifying fields when signature writing.
#                      %s - Variable Length String Field terminated with whitespace
#                           (e.g., ABC )
#                      %C - Variable Length String Field terminated with colon
#                           (e.g., ABC DEF:)
#                      %E - Variable Length STring Field terminated with newline
#                           (e.g., ABC DEF GHI\n)
#                      %Q - Variable Length String Field enclosed in quotes (e.g., "ABC DEF")
#                      %B - Variable Length String Field enclosed in square brackets
#                           (e.g., [ABC DEF])
#                      %P - Variable Length String Field enclosed in Paranthesis
#                           (e.g., (ABC DEF))
#                      %n - Variable Length Numeric value terminated by whitespace or
#                           non-numeric value (e.g., 123 )
#                      %i - IP Address in a dotted quad format (e.g., 10.100.100.125)
#                      %T - Military Time (e.g., HH:MM:SS)
#                      %t - Military Date/Time (e.g., MM DD HH:MM:SS). For example,
#                           May 7 12:12:53

#                      Example Format: %s%s%C%E

# FILE_DATA:           Field Number based on FILE_FORMAT to be included with
#                      event (e.g., Field 1 = %1)
# FILE_SIP:            Field Number that represents the Source IP Address
#                      (e.g, Field 1 = %1)
# FILE_DIP:            Field Number that represents the Destination IP Address
#                      (e.g, Field 1 = %1)
# FILE_WEBCONVERT:     Indicates Whether or not to strip anti-ids patterns from
#                      web traffic.
# REPORT_TRUNCATED_FILES: Generate Event if the file reduces in size
# REPORT_INCREASED_FILES: Generate Event if file grows in size
# REPORT_PERM_CHANGE:  Generate an event if the permissions change for the file
# REPORT_MD5_CHECKSUM: Generate an event if the MD5 Checksum changes on the file
# REPORT_UID_CHANGE:   Generate an event if the user identifier changes for the file
# REPORT_GID_CHANGE:   Generate an event if the group identifier changes for the file
# REPORT_MD5_RATE:     Number of seconds between MD5 Checks for this resource.
#                      Allows a different rate to be used for each resource
#                      rather than the default MD5_RATE.

#=====================================================================
FILE_NAME=BootFile
FILE_TYPE=F
FILE_PATH=\boot.ini
FILE_FORMAT=%E
FILE_DATA=%1
REPORT_MD5_CHECKSUM=1
```

FIG. 12B

```
FILE_NAME=EvtLog-Application
FILE_TYPE=E
FILE_LOGNAME=Application
FILE_FORMAT=%B%B%B%B%B%B%B%B%B%E
FILE_DATA=%1%2%3%4%5%6%7%8%9

FILE_NAME=EvtLog-Security
FILE_TYPE=E
FILE_LOGNAME=Security
FILE_FORMAT=%B%B%B%B%B%B%B%B%B%E
FILE_DATA=%1%2%3%4%5%6%7%8%9

FILE_NAME=EvtLog-System
FILE_TYPE=E
FILE_LOGNAME=System
FILE_FORMAT=%B%B%B%B%B%B%B%B%B%E
FILE_DATA=%1%2%3%4%5%6%7%8%9

FILE_NAME=Reg-Run
FILE_TYPE=R
FILE_HIVE=HKLM
FILE_KEYNAME=Software\Microsoft\Windows\CurrentVersion\Run FILE_NAME=Reg-RunOnce
FILE_TYPE=R
FILE_HIVE=HKLM
FILE_KEYNAME=Software\Microsoft\Windows\CurrentVersion\RunOnce FILE_NAME=Reg-RunServices
DISABLED=N
FILE_TYPE=R
FILE_HIVE=HKLM
FILE_KEYNAME=Software\Microsoft\Windows\CurrentVersion\RunServices FILE_NAME=Reg-RunOnceEx
DISABLED=N
FILE_TYPE=R
FILE_HIVE=HKLM
FILE_KEYNAME=Software\Microsoft\Windows\CurrentVersion\RunOnceEx FILE_NAME=Reg-KnownDLLs
DISABLED=N
FILE_TYPE=R
FILE_HIVE=HKLM
FILE_KEYNAME=System\CurrentControlSet\Control\Session Manager\KnownDLLs FILE_NAME=Reg-Services
DISABLED=N
FILE_TYPE=R
FILE_HIVE=HKLM
FILE_KEYNAME=System\CurrentControlSet\Services FILE_NAME=NT-HAL
DISABLED=N
FILE_TYPE=F
FILE_PATH=%SYSTEMROOT%\system32\hal.dll
FILE_FORMAT=%E
FILE_MODIFIER=0
FILE_DATA=%1
REPORT_MD5_CHECKSUM=1

FILE_NAME=NT-Kernel
DISABLED=N
FILE_TYPE=F
FILE_PATH=%SYSTEMROOT%\system32\ntoskrnl.exe
FILE_FORMAT=%E
FILE_MODIFIER=0
FILE_DATA=%1
REPORT_MD5_CHECKSUM=1

FILE_NAME=IIS
```

FIG. 12C

```
DISABLED=N
FILE_TYPE=F
FILE_PATH=%WinDir%\System32\LogFiles\W3SVC1\EXyymmdd.log
FILE_FORMAT=%E
FILE_MODIFIER=22
```

FIG. 12D

```
#================================================================================
# File: dsquire.sigs

# Description:  This configuration file (dsquire.sig) can be created to specify
#               signatures for each of the disk file, SNMP Trap or Event Log resources
#               defined in dsquire.net. This allows the contents of the disk file, SNMP
#               Trap or event log entry to be scanned specific character patterns.

#               An example would be to scan the Windows Security Event Log to detect
#               when an administrator logged on/off the system. The Logon/Logoff
#               example is illustrated by the 'EvtLog-Security' resource definition in
#               dsquire.net and the accompanying signature'
#               (e.g., LOGOFF:538-ADMINISTRATOR) in dsquire.sig

#               The following is an example signature:

#               ASP:DENALI-REMOVED EvtLog-System B %9:Denali/20successfully/20removed

#                 o Signature/Event Name (e.g., ASP:DENALI-REMOVED)
#                 o Resource Definition (e.g., FILE_NAME) from dsquire.net
#                   (e.g., EvtLog-System)
#                 o Signature Pattern Case Sensitivity. 'B' indicates that the
#                   signature pattern must pass a case sensitive match 'S' indicates
#                   that the signature pattern is not case sensitive.
#                 o Signature Pattern (e.g., %9-Denali/20successfully/20removed).
#                   Indicates the character pattern to detect.

#           Signature Patterns are comprised of 3 elements:

#           1  Comparison Operator (if ommitted the operator defaults to string test '~').
#                  ~     Test the field number to check if the character sequence
#                        is contained in the field
#                  =     Test the field number specified for numeric equality with the
#                        character sequence.
#                  >     Test the field number to check of it is numerically greater
#                        than the character sequence.
#                  <     Test the field number to check if it is numerically less
#                        than the character sequence.
#                  !     Test the field number to check if the character sequence is
#                        NOT contained in the field

#           2. Field Number (if ommitted the field number defaults to '%1:'). Specifies
#              which field (based of the defined FILE_FORMAT in dsquire.net) to be
#              checked. Field numbers are specified by preceding the field number with
#              a percent sign and following it with a colon. For example, '%2:'
#              indicates that the second field based on the defined FILE_FORMAT should be
#              examined.

#           3. Character Sequence.
#              Specifies the character sequence to match against. The pattern must use
#              hexadecimal values for any special characters and not contain spaces.
#              For example many of the signatures below specify the space character as a
#              hexadecimal 0x20 (e.g., /20).

#              Multiple Character sequences can be scanned by placing a comma between
#              each signature pattern. For example, to develop a signature which scans
#              field 4 for the pattern "GET /etc/passwd" and field 8 to ensure it is not a
#              "404", the following signature pattern can be used:

#                   ~%4:GET/20/2fetc/2fpasswd,!%8:404

#              There is no limit to the number of patterns that can be chained together
```

FIG. 13A

```
#              this way.  Squire will properly build signature patterns in memory based
#              on available memory without imposing a hard limit.

#              The character sequence can scan for a match on one of many patterns by
#              using an OR clause (e.g., |).  For example, to scan field 5 for either
#              "passwd" or "services", the following signature pattern can be used:

#              -%5:passwd|service

#              There is not a hard limit to the number of OR clauses that can be used
#              within a character sequence.

#              Sample Signature:

#              This signature indicates that the resource defined as
#              'FILE_NAME=EvtLog-System' in dsquire.net should be examined for
#              signature activity.  As activity occurs within this resource, each record
#              is parsed based on the FILE_FORMAT definition and the ninth field
#              (e.g., '%9:') should contain the case-sensitive (e.g., 'B') string
#              (e.g., defaulted to '~') "Denali successfully removed".  If a match occurs,
#              an event is generated named "ASP:DENALI-REMOVED".

#              ASP:DENALI-REMOVED EvtLog-System B %9:Denali/20successfully/20removed

#      Copyright (C) Enterasys Networks 2001, 2002
#=========================================================================
ASP:DENALI-INSTALED EvtLog-System B %9:Denali/20successfully/20installed
ASP:DENALI-REMOVED EvtLog-System B %9:Denali/20successfully/20removed
ASP:SERVICE-STARTED EvtLog-System B %6:ASP,%9:Service/20started.
ASP:SERVICE-STOPPED EvtLog-System B %6:ASP,%9:Service/20stopped.
BACK-ORIFICE:WEB IIS B %1:server /20BO/2f
CHECKPOINT:POLICY EvtLog-System B %6:FWiSVC,%9:Fetching/20Security/20Policy,%9:suceeded
CHECKPOINT.START EvtLog-System B %6:FireWall/2d1,%9:FireWall/2d1/20server/20is/20running
```

MODULAR SYSTEM FOR DETECTING, FILTERING AND PROVIDING NOTICE ABOUT ATTACK EVENTS ASSOCIATED WITH NETWORK SECURITY

BACKGROUND OF THE INVENTION

The present invention relates to network systems and, more particularly, to systems and methods for detecting attacks to network systems.

Presently, in conventional intrusion detection systems, all packets are detected and reported ahead without a systematic technique to filter out those deemed to be of interest in a particular situation. Higher transmission speeds and new attack patterns can overwhelm such a monolithic arrangement of "mass detection and reporting." Thus, there remains a need for a more effective process of filtering detected events.

SUMMARY OF THE INVENTION

A computer-readable medium having computer-executable instructions for performing intrusion detection of a computer network having at least one host computer coupled thereto, said computer-readable medium being loadable on the at least one host computer, said computer-readable medium comprising an array of event processing means wherein each one of said event processing means runs concurrently without impeding each other's performance, said array of event processing means monitoring resources on the at least one host computer or monitoring activity forwarded to the at least one host computer via the computer network and generating event data corresponding to said monitoring.

A method for efficiently managing and reporting intrusion, or attempted intrusion, events of a computer network. The method comprises the steps of: (a) providing an array of event processing means on a host computer, coupled to the computer network, that operate concurrently without impeding each other's performance and wherein each of the event processing means detects a corresponding event related to intrusion, or intrusion attempts, to form event data; (b) passing the event data to a plurality of configured modules on the host computer, in serial fashion, that alter the contents of the event data that is to be reported to form filtered event data or that discard the event data not considered of value to report; and (c) passing all of the filtered event data to a second plurality of configured modules for providing notification of the intrusion or intrusion attempts.

BRIEF DESCRIPTION OF THE DRAWINGS

FIG. 1A depicts a functional diagram of an exemplary intrusion detection system, which includes the present invention, integrated into a computer network;

FIG. 3 is an exemplary screen of a security policy resource definition screen-file contents;

FIG. 4 lists record format tokens used for parsing records into individual fields;

FIG. 4A lists record format tokens using a number preceding the string token (%s) for specifying a field width;

FIG. 5 depicts a Windows NT Event viewer;

FIG. 6 specifies a signature search clause format;

FIG. 8 specifies signature comparison operators;

FIGS. 9A–9B specifies module definition file attributes;

FIG. 10 specifies event format tokens used for building EventFormats in the module definition file;

FIGS. 11A–11C depicts a sample module definition file;

FIGS. 12A–12D depicts a sample resource definition file; and

FIGS. 13A–13B depicts a sample signature definition file.

DETAILED DESCRIPTION OF THE INVENTION

Figure 1B:
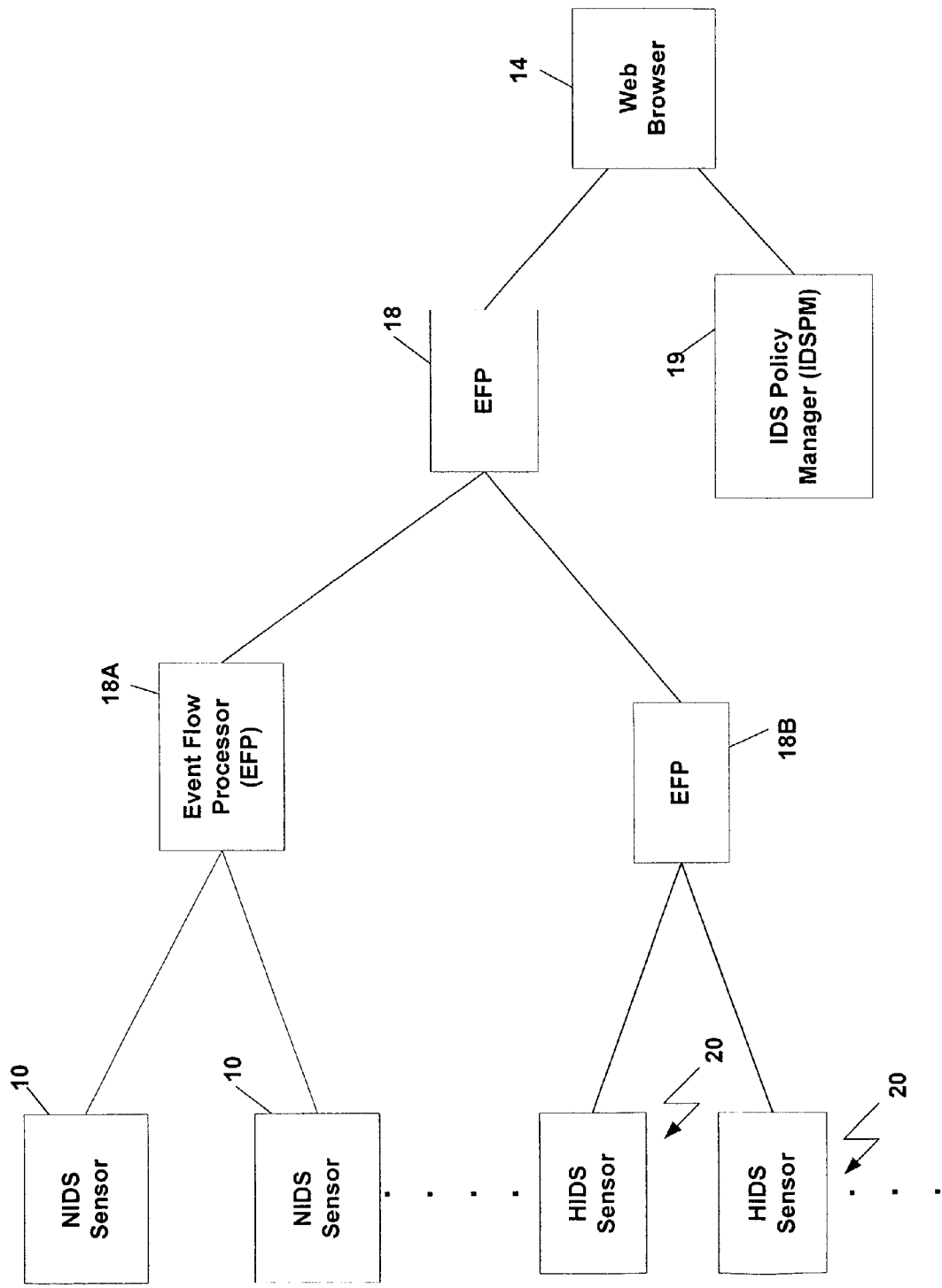
FIG. 1B depicts a block diagram of an exemplary hierarchy

The present invention 20 forms one tool of an intrusion detection system (IDS) for computer networks that is sold under the tradename Dragon™ by the Assignee of the present application, namely, Enterasys Networks, Inc (hereinafter "Enterasys"). The IDS tools comprise a network IDS sensor (NIDS sensor) 10, a host-based IDS sensor (HIDS sensor) 20, which is the subject matter of the present application, and an IDS server 15. FIG. 1A illustrates, by way of example only, an IDS integrated into a computer network which uses all three of these tools.

The NIDS sensor 10 monitors network packets for, among other things, computer criminals, employee misuse and network anomalies on a monitored network 4. When the NIDS sensor 10 observes an event, the sensor 10 can send pages and email alerts, take action to stop the event and record it for future forensic analysis.

A second tool of the IDS is the present invention 20, which is a host-based IDS sensor (HIDS sensor) 20 that detects attacks targeted at the host system on which it is installed, e.g., on a web server 1, a domain name server (DNS server) 2, a mail server 3, etc. As will be discussed in detail later, the HIDS sensor 20 detects attacks by monitoring the output to the system and audit logs. It is signature-based and identifies and analyzes system and audit messages for telltale signs of system misuse or attack. Moreover, the HIDS sensor 20 also monitors the logs of applications running on the host (including mail servers 3, web servers 1, and FTP servers, etc.). Since these are the targets of many attacks and their logs contain a wealth of security information, this capability is very important. In addition, the HIDS sensor 20 can analyze the logs of firewalls if forwarded via SYSLOG or SNMP. The HIDS sensor 20 can also monitor system files via its file integrity checking feature for an additional level of detection and protection since misuse or attack is often evidenced by the modification of a sensitive system file. For example, attackers commonly seek a user account that can be used for subsequent attacks on a system. In order to accomplish this, the attacker must modify the file containing user accounts and passwords. The HIDS sensor 20 detects this activity via its file integrity checking capabilities and, notifying an IDS administrator when key system and security files have been accessed, modified or even deleted. The HIDS sensor 20 is sold under the tradename "Dragon™ Squire" or simply "Squire" and any reference to these throughout this Specification corresponds to the HIDS sensor 20.

The third tool of the IDS is the IDS server 15 which can manage multiple NIDS sensors 10 and the engines (as will be discussed in detail later) of HIDS sensors 20. The IDS server 15 is the management and reporting system for the IDS. The NIDS sensors 10 and HIDS sensors 20 communicate with the IDS server 15 via a secure (preferably authenticated and encrypted) management and monitoring network 11; furthermore, communications between the NIDS sensor 10 and the server 15, or the HIDS sensor 20 and the server 15 can be initiated in either direction. This is important in integrating these three tools into a computer network where firewalls prohibit inbound connections because the IDS server 15 can initiate communications outbound. Also, the IDS server 15 includes an IDS policy manager (IDSPM) application. The IDSPM is the central configuration and management tool that provides remote administration of deployed NIDS sensors 10 and HIDS sensors 20. From within the IDSPM, the NIDS sensors 10 and the HIDS sensors 20 can be configured individually or in logically-created groups. Updated signature sets for the NIDS sensors 10 and the HIDS sensors 20 can also be centrally applied, or, if so configured, can be updated daily with new signatures from an Enterasys signature server (not shown). An exemplary IDS server is the IDS server sold under the tradename "Dragon™ Server".

An IDS workstation 13 provides an IDS administrator with the ability to communicate with the IDS. Also, a firewall 17 permits only NIDS sensor 10 and HIDS sensor 20 traffic.

Another important portion of the IDS is an event flow processor (EFP) 18. The EFPs consolidate IDS events from the NIDS sensors 10 and the HIDS sensors 20 into one stream. The EFP 18 is a software product that Enterasys built from scratch and sells. In particular, the EFP 18 is a server machine where a reporting graphical user interface (GUI) resides. Normally, each HIDS sensor 20 sends events (via EAE Ring Buffer module) to a centralized EFP 18. The EFP aggregates events from each of the HIDS sensors 20 that report to it. Reports can be access by pointing a web browser 14 at the EFP 18. If desired, aggregated events from one EFP 18 can be forwarded to other EFPs 18 in a hierarchy which can be routed to the IDSPM 19; FIG. 1B provides an exemplary "tiered" configuration showing NIDS sensors 10 passing on IDS events to a first EFP 18A while HIDS sensors 20 pass on IDS events to a second EFP 18B. These two EFPs 18A/18B, in turn, pass on the event data onto a third EFP 18 which communicates the event data to the IDSPM 19. All EFPs communicate over an encrypted Blowfish data channel with IP-based access control. TCP sessions can be initiated from EFP to EFP or from NIDS sensors 10 and HIDS sensors 20 to EFPs in either direction, which makes deployment in network-address-translation (NAT) environments easier. It should be understood that the "tiered" configuration is by way of example only and can be used where, for example, privacy is an important concern. For example, EFP 18A processes customer A's IDS events, EFP 18B processes customer B's IDS events while EFP 18 (e.g., reports to corporate headquarters for customers A and B) processes both customer A's IDS events and customer B's IDS events. Thus, by having local EFPs (18A and 18B)only process IDS events from the NIDS sensors 10 or HIDS sensors 20 to which they are coupled, privacy between customers A and B is assured. This partitioning also reinforces access of control of IDS events based on the location from which it originated. Moreover, the use of multiple EFPs, rather than just a single EFP, for processing these IDS events, also decreases throughput time. However, it should be understood that the important feature is that at least one EFP is used for processing IDS events. The EFP can be implemented using an Enterasys DSPMS event flow processor.

A web browser 14, as part of the IDS administrator workstation, allows the administrator, among other things, to see the IDS events and to check on the status of the IDS.

The HIDS Sensor 20

The present invention 20 is a modular system for detecting, filtering and providing notice about attack events associated with network security. The present invention 20 is a host-based IDS (HIDS) sensor that is capable of monitoring resources on the deployed host and activity forwarded to the host via SNMP or SYSLOG. The present invention 20 can be run stand-alone or fully-integrated into an IDS. Events can either be stored locally on the HIDS sensor 20 or forwarded to EFPs 18 and analyzed with the IDS reporting tools. One of the key features of the HIDS sensor 20 is its modular architecture which allows for custom modules to be developed which can integrate events unique to a customer into the IDS reporting tools.

Figure 2:
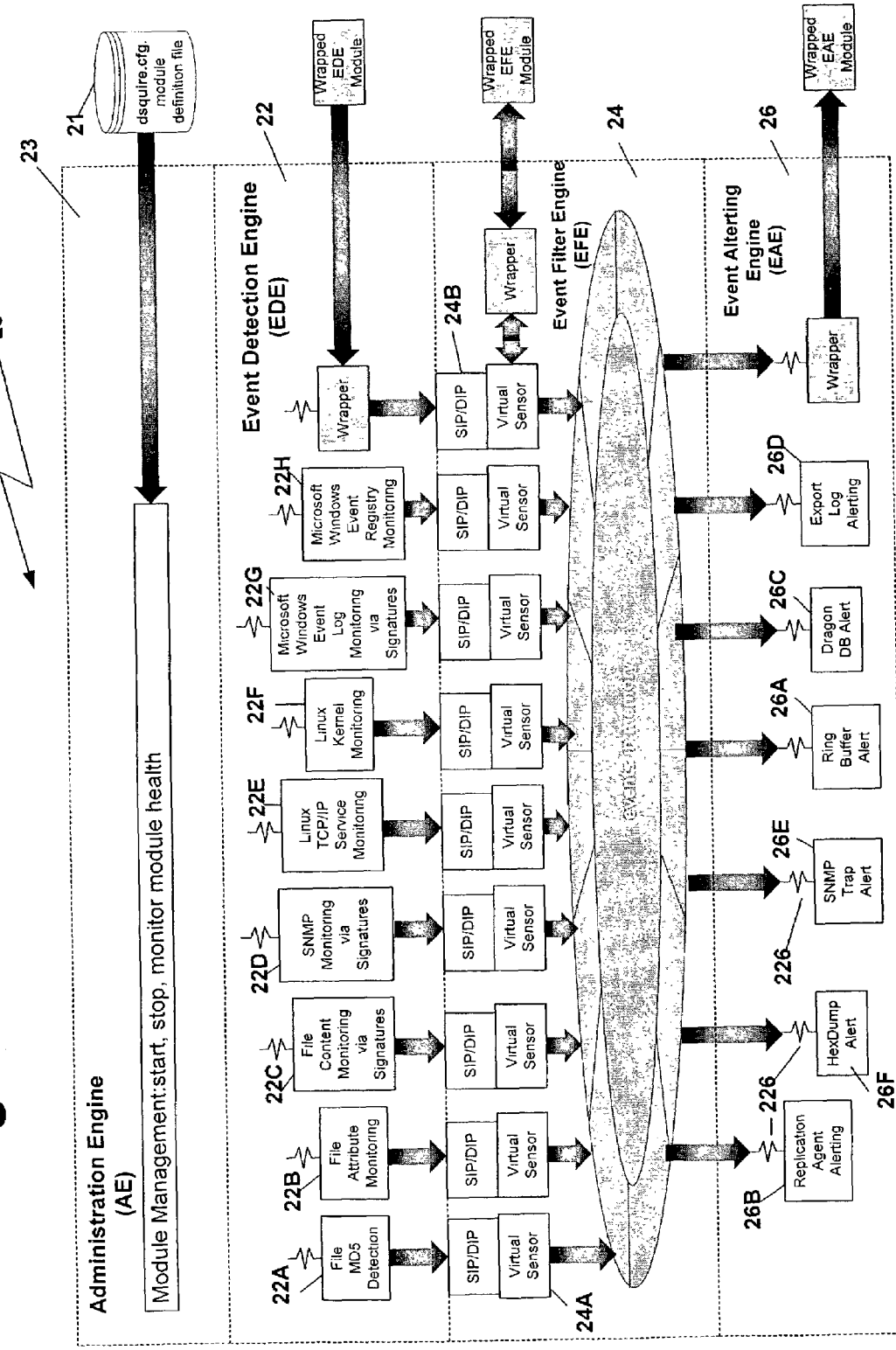
FIG. 2 illustrates the modular architecture of the present invention showing modules active in each of the engines.

As shown in FIG. 2, the present invention 20 is a framework that includes three engines: an event detection engine (EDE) 22, an event filter engine (EFE) 24 and an event alerting engine (EAE) 26. All functionality of the present invention 20 is achieved by installing modules within each of these engines. These modules can be developed by Enterasys or can be custom-developed by third-party or customer resources. Both the Enterasys-provided modules and the custom-module development are discussed in detail below.

The present invention 20 (hereinafter "HIDS sensor 20") utilizes a module definition file 21 (e.g., dsquire.cfg) that operates through an administration engine (AE) 23 to determine which modules are activated within each of the engines. This definition file is also described in detail later. FIG. 1 illustrates the framework of the HIDS sensor 20 with modules active in each of the engines. The AE 23 is responsible for processing the module definition file 21 and loading and starting each of the modules listed in the file. It then monitors the health of the modules and restarts them if necessary. For scheduled modules (modules that are expected to terminate and start again at fixed intervals), the AE 23 monitors the schedule and starts these modules at the proper time.

The EDE 22 is responsible for detecting and generating a HIDS sensor 20 event. Any events generated by the framework of the HIDS sensor 20 are the result of an EDE module detecting the event and forwarding it to the framework for processing.

The HIDS sensor 20 framework spins a thread for each of the EDE 22 modules configured. This allows the modules to run concurrently without impeding each other's performance. For example, one module may block for activity on the network while another calculates MD5 hashes of key files; the MD5 calculation then proceeds, regardless if the other module is blocked. The HIDS sensor 20 framework then accepts events from each of the EDE 22 modules as they occur. Events passed from EDE 22 modules to the framework are synchronized to prevent collisions between modules. By way of example only, the EDE 20 modules include MD5 detection module 22A, file attribute monitoring module 22B, file content monitoring module 22C, SNMP monitoring via signatures module 22D, Linux TCP/IP service monitoring module 22E, Linux kernel monitoring module 22F, Microsoft Windows event log monitoring via signatures module 22G and Microsoft Windows event registry monitoring module 22H.

EDE 20 modules can be persistent or scheduled to run at fixed intervals. Persistent EDE modules are launched by the EDE and are expected to run without terminating. The persistent module invokes a callback function as events are detected. Scheduled modules are expected to run for a period of time and then terminate. During the module's life, any events detected are forwarded to the HIDS sensor 20 framework via a callback function. When a configured time interval elapses, a new instance of the EDE module is then started providing the previous instance has terminated. This scheduled functionality allows modules to easily be developed to scan the HIDS sensor 20 for activity at fixed intervals. For example, a module could scan the HIDS sensor 20 once per hour for the existence of a "malicious" file.

The EDE modules activated within the HIDS sensor 20 framework can be a blend of modules provided by Enterasys and modules developed by the customer. Examples of EDE modules provided by Enterasys include the MD5 file integrity checking module 22A, the log analysis module 22C, etc. Each of the Enterasys-supplied modules are pre-configured within the installed module definition file (e.g., dsquire.cfg) and are located in the ./modules/modules-ets directory.

A customer could develop an EDE 20 module to monitor the security of a custom in-house application and easily generate events as suspicious activity occurs. By doing so, the customer-generated events are integrated with all other HIDS sensor 20 events in the back-end reporting systems. The customer-generated events are then fed through the EFE 24 and EAE 26 modules along with all other events.

The EFE 24 provides a choke point through which all events from all EDE 22 modules pass prior to the EAE 26 processing them. This provides the ability to develop modules that can scrutinize the EDE 22 events and either alter the contents of the event or instruct the HIDS sensor 20 to discard the event. In particular, where an event is detected by an EDE module, that event is given a generic name such as "SquireA" or "SquireB", etc. An EFE module, pre-programmed to either alter the contents (i.e., modify the generic name for reporting purposes) or discard the event, filters the events upon arrival from the EDE modules. As will be discussed in detail later, when the event is passed onto the EFE 24, a virtual sensor translation module 24A alters the generic name based on the source network address for those events deemed worth reporting, i.e., the module 24A looks at the source network address and alters the generic name based on the source address. It should be understood that an individual EFE module applies to all EDE modules, i.e., when the virtual sensor translation module 24A receives an event, that module 24A performs its designated action (alter content of event or discard event, based on what the EFE module was programmed to do) regardless of which EDE module generated the event; once an EFE module is active, it sees all events. As custom modules for the EFE are developed by the user, these custom modules are activated by configuring them in the module definition file. Once the modules are configured, the HIDS sensor 20 recognizes them and activates them upon startup.

Events generated by EDE 22 modules are passed through each of the configured EFE 24 modules serially in the order they appear in the module definition file. This is important for two reasons. First, subsequent EFE 24 modules receive events filtered based on previous EFE 24 modules. This means that a previous EFE 24 module could alter the contents (or discard) the event prior to a later EFE 24 module seeing the event. Second, if written badly, an EFE 24 module can impact the overall performance of the HIDS sensor 20 framework. Since all events pass through the EFE 24 modules serially, the EFE throughput is based on the total elapsed time of all configured EFE 24 modules. Examples of EFE modules provided by Enterasys include virtual sensor translation module 24A and default SIP/DIP processing module 24B.

The EAE 26 receives all HIDS sensor 20 events generated by each of the EDE 24 modules after any filtration by EFE 24 modules is finished. The EAE 26 modules are mostly used to generate alerts or forward events to a destination. For example, alerting modules may dump events to the screen, update SQL databases or generate SNMP traps.

The HIDS sensor 20 framework spins a thread 226 for each of the EAE 26 modules. This allows each of the EAE 26 modules to run concurrently while minimizing the impact on each other's performance. Delivery of events to the EAE 26 modules is guaranteed. As an event passes through the last configured EFE 24 module, each EAE 26 thread 226 receives the event and calls the registered "ProcessFunction" for its EAE 26 module. The throughput of events through the EAE 26 is throttled to the speed of the slowest EAE 26 module to guarantee that all modules receive the event. This means that a poorly written EAE 26 module can impact the overall performance of the EAE 26.

Each EAE 26 module receives every event that passes through the EFE 24. This allows one EAE 26 module to record all events (e.g., send to EFP 18) and another EAE 26 module to examine the events and perform specific processing (e.g., generate SNMP trap if certain conditions are met and ignore other events).

EAE 26 modules provided by Enterasys include ring buffer alerting module 26A, replication agent alerting module 26B, Dragon database (DB) alerting module 26C, export log alerting module 26D, SNMP trap alerting module 26E, and hexidecimal dump alerting module 26F. A customer can develop an EAE 26 module to record events directly to an in-house database, perform event correlation, or feed events to a locally-installed windows application.

As mentioned earlier, the modular architecture of HIDS sensor 20 allows modules to be custom-developed and seamlessly integrated into the IDS. HIDS sensor 20 modules can be developed as either dynamically-linked shared objects (e.g., myModule.so, myModule.dll) or simple scripts (e.g., Perl, C, ksh). Dynamically-linked modules are written in C and utilize callback functions to pass events between the engines 22–26. On the other hand, scripted modules are simple scripts that are "wrapped" as modules by HIDS sensor 20. Communication between the engines 22–26 and the wrapped module (e.g., see "Wrapped EDE Module", "Wrapped EFE Module" and "Wrapped EAE Module" in FIG. 2) is accomplished via Unix pipes. As a result, a wrapped module passes events between the engines 22–26 simply by reading and writing to stdin and stdout.

The following advantages should be considered when choosing to build a dynamically-linked module on either a Unix or Windows platform:

Less Overhead. Minimizes the number of separate processes that are running via HIDS sensor 20.

Efficiency. Events are passed between modules via pointers as opposed to reading and writing the events across Unix pipes.

Allows binary data to be included in event data. Wrapped modules are restricted to printable ASCII characters.

Convenient callback functions provided for recording events and logging messages. This allows a tighter integration into the HIDS sensor 20 framework by allowing custom modules to easily log data to a centralized log file.

This is the only alternative for Windows platforms sensor. The wrapped module is not available under Windows.

The following advantages should be considered when choosing to build a wrapped module on a Unix platform:

Ease of development. Allows for modules to be written as shellscripts, Perl scripts or C programs.

Less strict program structure. No callbacks are used. Code is only required to format an event and write it to stdout based on a configured EventFormat (see "HIDS sensor 20 Configuration Files" below).

Ability to utilize system calls/functions that behave badly within a dynamically-linked threaded environment. For example, signal processing, fork( )ing, chdir( ) may adversely impact other threads within the HIDS sensor 20 framework.

Program fault isolation. If a wrapped module core dumps, it only impacts itself. In a dynamically-linked thread, the core dump causes all threads in the framework to abort.

Sample EDE, EAE and EFE modules can be found in the ./modules-templates/EDE, ./modules-templates/EAE and ./modules-templates/EFE directories respectively, and can be used as a tutorial for developing HIDS sensor 20 modules. Samples exist for both dynamically-linked and wrapped modules. The source code for each sample contains comments illustrating the architecture of the module.

Once the module is developed, a definition is added to the module definition file based on the settings outlined in the example configuration file. Typically, each sample module provided illustrates a sample module definition stanza at the top of the source code file.

As mentioned earlier, the HIDS sensor 20 is provided with any EDE 22, EFE 24 and EAE 26 modules already built by Enterasys. The following describes each of the modules in the EDE 22.

File MD5 detection module 22A: The HIDS sensor 20 is capable of monitoring files for modification by periodically checking the file's MD5 checksum. For example, assume that detecting changes in the contents of a security relevant file (e.g., /etc/passwd) is something that should be tracked. Changes in binary files such as /bin/ls or /bin/id could indicate that a system had been "back-doored". This means that a hacker has installed software on a compromised system that has extra functionality allowing the hacker continued access to the system. With MD5 technology, a unique cryptographic checksum can be computed for each file that is monitored. A possible checksum value could be '58d6457cf45cbe3ca487220d431ae675'. If this number changes, the file has been modified. By default, the HIDS sensor 20 encrypts and archives MD5 checksums locally on the deployed host. However, the HIDS sensor 20 can be configured to periodically send the MD5 checksum information to an EFP for offline storage. In this mode, an agent on the EFP scans the MD5 checksums as they are transmitted and compares the values against the values stored on the EFP. If a discrepancy is detected, the EFP generates an event indicating that the MD5 has changed. This added feature allows for a more secure environment by storing the MD5 checksums on a machine other than the one that is being attacked. This module is labeled MD5Detection in the EventDetectionEngine section of the Module Definition File (e.g., dsquire.cfg). Settings for the module can be activated on the DPM by examining the EDE-MD5Detection attributes in the Update Net File screen.

File attribute monitoring module 22B: files can be defined in the Resource Definition File (e.g., dsquire.net) by specifying a name of a file and the full pathname to the file. For each defined file, the following attributes can be monitored and events can be generated for:

File Permissions
File User Ownership
File Group Ownership
mode Values
File Deletion
Truncated Files
Growing Files
Modification Time Changes These file definitions help define a security policy for each HIDS sensor 20. Security policies can be maintained by either manually modifying the Resource Definition File or by using an associated graphical user interface, e.g., IDSPM GUI. This module 22B is labeled FileDetection in the EventDetectionEngine section of the Module Definition File (e.g., dsquire.cfg). Settings for the module can be activated on the IDSPM by examining the EDE-FileDetection attributes in the Update Net File screen.

File Content Monitoring via Signatures module 22C: The contents of log files can be scanned to alarm if specified signature patterns occur. This is configured by specifying a record format describing the record layout for a defined file and then defining signatures that pattern match within the record format. The Resource Definition File (e.g., dsquire.net) contains the list of files to be monitored and their formats, and the Signature Definition File (e.g., dsquire.sigs) contains a list of signatures that are to be applied to each file. This capability allows log files (e.g., /var/log/messages, /var/log/httpd/access_log) to be reviewed for defined events. For example, the Apache access log can be reviewed for attempts to download /etc/passwd by defining a record format for accesslog in dsquire.net and then building the appropriate signature in dsquire.sigs. HIDS sensor 20 signatures are best maintained via the IDSPM. If the HIDS sensor 20 is installed on a log server (something that is receiving multiple syslog feeds) then the HIDS sensor 20 can be used to monitor events from those systems as well. For example, signatures exist for a wide variety of platforms including Cisco routers and many commercial firewalls. Security events discovered by the HIDS sensor 20 at the log host are sent to EFPs for correlation with other events from other HIDS sensors 20 and NIDS sensors 10. This module is labeled LogDetection in the EventDetectionEngine section of the Module Definition File (e.g., dsquire.cfg). Settings for the module can be activated on the IDSPM by examining the EDE-LogDetection attributes in the Update Net File screen.

SNMP Monitoring via Signatures module 22D: The HIDS sensor 20 can listen to a stream of SNMP traps from a variety of devices. The SNMP traps may be from firewalls, routers or any other type of device that can generate a trap. Signatures can be written and applied to the received SNMP traps. This allows HIDS sensor 20 agents to monitor a variety of network devices and provide a means of consolidating activity and integrating it into the Dragon enterprise. This module is labeled snmpDetection in the EventDetectionEngine section of the Module Definition File (e.g., dsquire.cfg).

Linux TCP/IP Service Monitoring module 22E: On Linux platforms, specific TCP and UDP services can be monitored to generate events as services are started or existing services terminate. The 'proc' file system is monitored for notification of network service starts and terminations. It is useful to monitor a host for new services that are started to detect unwanted services. New services are often started on a compromised host to provide a means of accessing the host via the network. This module is labeled ServiceDetection in the EventDetectionEngine section of the Module Definition File (e.g., dsquire.cfg). Settings for the module can be activated on the DPM by examining the EDE-ServiceDetection attributes in the Update Net File screen.

Linux Kernel Monitoring module 22F: The HIDS sensor 20 is capable of monitoring the integrity of the Linux kernel. Events are generated if the HIDS sensor 20 detects that any of the kernel system calls have been "hooked". System call hooking is a common method for rootkits to weaken the kernel by creating backdoors. A system call is hooked such that it provides a root shell to a non-privileged user when the non-privileged user calls a hooked system call and passes it special arguments. The HIDS sensor 20 can scan the kernel to ensure that it has not been previously infected with one of the common rootkits available.

Microsoft Windows Event Log Monitoring via Signatures module 22G: Microsoft Windows Event Logs (e.g., Application, System or Security) can be monitored much in the same manner as a regular log file. The event log is defined to the HIDS sensor 20 and a set of signatures can be applied to the definition. The HIDS sensor 20 monitors each defined event log and scans new event log entries for signature matches. This allows the HIDS sensor 20 to monitor any application that is capable of logging to a Windows event log. This module is labeled EventLogDetection in the EventDetectionEngine section of the Module Definition File (e.g., dsquire.cfg). Settings for the module can be activated on the DPM by examining the EDE-EventLogDetection attributes in the Update Net File screen.

Microsoft Windows Event Registry Monitoring module 22H: The HIDS sensor 20 is capable of monitoring the Microsoft Windows registry for modifications. Each Registry hive and key to be monitored are specified to the HIDS sensor 20. Any changes detected to the specified keys will cause an event to be generated. This allows the HIDS sensor 20 to monitor strategic registry hive/keys for tampering. This module is labeled RegistryDetection in the EventDetectionEngine section of the Module Definition File (e.g., dsquire.cfg). Settings for the module can be activated on the IDSPM by examining the EDE-RegistryDetection attributes in the Update Net File screen.

The HIDS sensor 20 also examines the current process table within the Linux kernel to generate events for any process that has elevated its user or group privileges. This is a common symptom of local buffer overrun exploits. The system process table contains a process running with elevated privileges whose parent process did not have those privileges. This module is labeled KernelDetection in the EventDetectionEngine section of the Module Definition File (e.g., dsquire.cfg). Settings for the module can be activated on the DPM by examining the EDE-KernelDetection attributes in the Update Net File screen.

The following describes each of the modules in the EFE 24.

Virtual sensor module 24A: The HIDS sensor 20 has the capability of assigning virtual sensor names to events based on the Source IP Address. This can be useful to further identify events when using the HIDS sensor 20 to consolidate events from many different event sources. For example, if the HIDS sensor 20 is used to catch SNMP traps from three different firewalls (e.g., 10.100.10.1, 10.100.20.1 and 10.100.30.1), it could be useful to identify these events with a virtual sensor name (e.g., Firewall-10, Firewall-20, Firewall-30). Otherwise, the firewall event activity is difficult to distinguish from each other. This module is labeled setVSensor in the EventFilterEngine section of the Module Definition File (e.g., dsquire.cfg). Settings for the module can be activated on the DPM by examining the EFE-VirtualSensor attributes in the Update Net File screen.

Default SIP/DIP Processing module 24B: A HIDS sensor 20 module is provided to set the default Source and Destination IP addresses on events whose SIP and DIP are missing. This module examines each event and will overlay the SIP/DIP with the configured settings from the Resource Definition File. Default SIP/DIP information can be specified by either providing a dotted quad address or specifying that the local address of the HIDS should be used. This module is labeled setSIPDIP in the EventFilterEngine section of the Module Definition File (e.g., dsquire.cfg). Settings for the module can be activated on the DPM by examining the EFE-Default SIP/DIP attributes in the Update Net File screen.

The following describes each of the modules in the EAE 26.

Ring Buffer Alert module 26A: On Unix platforms, this module is used to forward events to the Dragon 5 ring buffer as they occur. Once events are placed in the ring buffer, they are forwarded to EFPs for back-end processing and reporting. This is the most common alerting module in use on Unix platforms. Basically, this module is used to forward events into the IDS architecture (e.g., Dragon 5 Enterprise) architecture. This module is labeled RingBufferAlert in the EventAlertingEngine section of the Module Definition File (e.g., dsquire.cfg).

Replication Agent Alerting module 26B: On Windows platforms, this module is used to forward events to an EFP for back-end processing and reporting. This is the most common alerting module in use on Windows platforms. Basically, this module is used to forward events into the IDS (e.g., Dragon 5 Enterprise) architecture. This module is labeled ReplicationAgent in the EventAlertingEngine section of the Module Definition File (e.g., dsquire.cfg). Settings for this module can be found in the Windows registry under the registry key HKLM/Software/Enterasys/squire/2.0.

Database Alerting module 26C: On Unix platforms, the HIDS sensor 20 can be configured to record events directly to a Dragon Database file format. Once loaded in an IDS database format (e.g., Dragon Database format), the command line tools can be used against the database for event reporting. This module is most often used when running the HIDS sensor 20 stand-alone without forwarding events to EFPs. This module is labeled DragonDBAlert in the EventAlertingEngine section of the Module Definition File (e.g., dsquire.cfg).

Expert Log Alerting module 26D: On Windows platforms, this module is used to generate a local export log containing each event that has been generated. This module is most often used when running the HIDS sensor 20 in a standalone mode on Windows platforms. It can also be useful for testing/debugging. This module is labeled ExportLogAlert in the EventAlertingEngine section of the Module Definition File (e.g., dsquire.cfg). Settings for the module can be activated on the IDSPM by examining the EAE-ExportLogAlert attributes in the Update Net File screen.

SNMP Trap Alerting module 26E: The HIDS sensor 20 is capable of generating alerts based on events that are detected. Overall SNMP configuration information can be configured via the IDSPM web interface and is recorded in the Resource Definition File (e.g., dsquire.net). This configuration information specifies the destination address for the SNMP alert, the destination port, the object identifier (OID) and the community string. To enable SNMP alerting, the following settings need to be added to the Resource Definition File. These settings can either be added manually or via the IDSPM web interface. Please note that the values listed for each attribute are intended to be examples and should be replaced with values meaningful to the local environment.

SNMP_OID=1.3.6.1.4.1.4471
SNMP_COMMUNITY_STRING=public
SNMP_AGENT_IP=10.100.100.100
SNMP_SERVER_IP=10.100.100.10
SNMP_PORT=162

Once the HIDS sensor 20 is restarted with these settings enabled, an SNMP trap is forwarded to the specified SNMP_SERVER_IP for each event generated. This module is labeled SNMPTrapAlert in the EventAlertingEngine section of the Module Definition File (e.g., dsquire.cfg). Settings for the module can be activated on the IDSPM by examining the EAE-SNMPTrapAlert attributes in the Update Net File screen.

Hexidecimal Screen Dump module 26F: On Unix platforms, the HIDS sensor 20 can be configured to display events to the screen as they occur. This feature can be useful when testing/debugging to watch events in realtime. This module is labeled HexDumpAlert in the EventAlertingEngine section of the Module Definition File (e.g., dsquire.cfg).

The HIDS sensor 20 uses the concept of a security policy. In its simplest form, a security policy is a collection of resource definitions listing the files, logs, SNMP sources, Windows registry keys and Windows event logs to be monitored on the deployed host. The security policy is updated via the IDSPM GUI and is stored in the Resource Definition File (e.g., dsquire.net) file. The following sections describe the attributes that define security policies for each resource type.

File Attribute Monitoring:

The HIDS sensor 20 is capable of monitoring the following file attributes:

Permissions

This option is turned on to generate an event if permissions associated with the file are altered. Under Unix, the HIDS sensor 20 monitors the setuid, setgid, sticky-bit, owner-read, owner-write, owner-execute, group-read, group-write, group-execute, other-read, other-write and other-execute permissions. If the permissions change, a FILE:PERMS-CHANGED event is generated. In Windows, the HIDS sensor 20 monitors the ACLs associated with a file (viewable in Windows Explorer by right-click/properties/security/permissions). If any of the permissions are changed, the HIDS sensor 20 will report the modified entry. It should be noted that this option results in additional CPU overhead in Windows. If performance is an issue, monitor the CPU load and adjust this setting accordingly.

Inode

Turning this option on generates an event if the inode number for a file has changed. This is useful to determine if a file has been moved/deleted and replaced or if a log has been rotated. If the inode changes, a FILE:INODE-CHANGED event is generated.

User ID

Turning this option on generates an event if the owner of the file has changed. If the owner changes a FILE:UID-CHANGED event is generated. Under Windows, this setting results in additional CPU overhead. The CPU performance should be monitored and this setting adjusted accordingly.

Group ID

Turning this option on generates an event if the group of the file has changed. If the group changes a FILE:GID-CHANGED event is generated. Under Windows, this setting results in additional CPU overhead. The CPU performance should be monitored and this setting adjusted accordingly.

Increased

Turning this option on generates an event if the size of the file has become larger. If the file grows in size, a FILE:INCREASED event is generated.

Truncated

Turning this option on generates an event if the size of the file has become smaller. If the file shrinks in size, a FILE:TRUNCATED event is generated. Log files may be altered by an attacker to remove entries that log their activity. A log file should not normally reduce in size.

File Hashing: MD5

Turning this option on generates an event if the hash value (produced by a hashing algorithm for files, e.g., MD5 hash produced by an MD5 hashing algorithm) of the file has changed. If the hash value changes, a FILE:MD5-CHANGED event is generated. The MD5 values are stored in an encrypted file on the HIDS sensor 20. When the file is first created, a FILE:MD5-MISSING event is generated to alert the security administrator that archived MD5 values do not exist. This is valid during the initial configuration of the HIDS sensor 20. If this event happens after the HIDS sensor 20 is operational, it is indicative of the MD5 hash values being deleted. As each file's MD5 value is initially calculated, a FILE:MD5-INIT event is generated. This is valid during the initial configuration. If the event is generated after the HIDS sensor 20 has been operational, it indicates that the archive MD5 values have been tampered with. A FILE:MD5-INVALID event is generated if the encrypted archived MD5 values are unreadable. This event indicates tampering with the MD5 tile. The intent is that an event will be generated if a hacker tries to alter/delete the encrypted MD5 archive (FILE:MD5-MISSING, FILE:MD5-INIT, FILE:MD5-INVALID). If a file that is being monitored is altered, a FILE:MD5-CHANGED is generated.

Modification Time

An alarm is generated if the modification time changes on a file without a change in the file's size. If the modification time changes, a FILE:MTIME-CHANGED event is generated.

Sample Screen

FIG. 3 is an example of a security policy defined via the IDSPM web interface. In this screen sample, the messages file is being defined as part of the Solaris policy. Each of the file attributes described above are listed at the bottom of the screen. Each attribute can be enabled or disabled by clicking on either yes or no.

File Content Monitoring via Signatures

A security policy can be enhanced by associating a signature library with it. Each file defined in the security policy can have signatures that are used to examine the file content for known attacks. This allows the contents of a file to be scanned for specific events. For example:

Scan the /var/log/massages file for root logins.

Scan the /var/log/httpd/access log for successful PHF requests.

Scan the web logs for anyone requesting the /etc/passwd file.

Each signature library is associated with a single file definition. This allows each signature in the library to be specific to a particular file definition's record format.

The following section describes the attributes used in the security policy when building signature libraries.

Record Format

A record format can be specified to parse each record in the specified file into distinct fields. This is useful when building signatures needed for searching the record for a pattern that is likely to be duplicated. For example, searching for an error code of '404' in the Apache access_log may incorrectly match other data within the record. The record can be parsed into fields to specifically search the error code field for '404'. If no record format is given, the entire record is treated as one large field (e.g., defaults to %E). Record formats are built by specifying tokens that describe each field in the record. FIG. 4 describes the various tokens available when defining a record format. A number can be specified preceding the string token (%s), as shown in FIG. 4A, to specify a field width. The number of bytes specified will be parsed unless a newline or end of string is encountered prior to reaching the number of bytes. Trailing whitespace characters remain unparsed unless they occur within the specified field width.

The following sample illustrates how the record format can be specified for the /var/log/massages so that the record is parsed into four distinct fields. These fields can then be used when building signatures to specify search patterns for each of the individual fields.

File: /var/log/massages
Sample Record: May 7 13:49:24 basilisk rc: Stopping keytable succeeded
Format Field: %t%s%C%E
%t='May 7 13:49:24'
%s='basilisk'
%C='rc'
%E='Stopping keytable succeeded'

Data Field

Specify the field number(s) to be included as data in any generated events. Field numbers are specified with a preceding percent sign. For example, %1 indicates that the first field should be included in the event. Multiple fields can be specified by listing one after the other. For example, fields 4, 5, 6 and 8 can be specified as %4%5%6%8. As events are generated, the fields specified as data fields will be included in the event and viewable within the mksession tool. If data fields are specified, the record format must be specified for the file and support the parsing of fields listed in the data field. If no Data field is specified, the HIDS sensor 20 defaults to the first field (e.g., %1).

SIP Field

Specify the field number based on the record format (e.g., %2=second field based on record format, 2=second space separated field) that represents the source IP address. If a source IP Address is specified, it will be included in any generated events and reported via the Dragon Consoles. By default, the HIDS sensor 20 assumes a source IP address of 0.0.0.0. For example, the source IP address is included in each record in the Apache access_log file. The following example illustrates how to define a record format and SIP field to support parsing the source IP field and including it in Squire Events:

Sample Log Entry:
27.0.0.1—[07/Jun/2000:08:36:04-0400]"GET /dragon/drider/index.html HTTP/1.0" 401 397
Sample FORMAT: %i%s%s%B%Q%n%n
Field 1: %i='127.0.0.1'
Field 2: %s='–'
Field 3: %s='–'
Field 4: %B='[07/Jun/2000:08:36:04-0400]'
Field 5: %Q='"GET /dragon/drider/index.html HTTP/1.0"'
Field 6: %n='401'
Field 7: %n='397'

Sample SIP FIELD: %1

The SIP field can also be specified by entering a field number without the preceding percent sign (e.g., 1 instead of %1). This alternative indicates that the SIP field should be determined by parsing the field from the record assuming that spaces terminate each field. This parsing ignores any record format that has been specified and parses strictly based on space terminated data fields. This can be useful to simplify the record format and signature creation and still allow the SIP to be extracted from the record.

DIP Field

Specify the field number (e.g., %2=second field based on record format, 2=second space separated field) that represents a destination IP. If a destination IP address is specified, it will be included in any generated events and reported via the Dragon consoles. By default, the HIDS sensor 20 uses the local host IP Address as the DIP.

Web Convert:

Specify if the file is a web log that is susceptible to anti-ids techniques. If so, the web convert option will cause the anti-ids techniques to be neutralized prior to any signature matching.

The conversion occurs as follows:

URL Encoding will be decoded. Hexadecimal values will be converted to their ASCII counterparts. For example GET%20%2fcgi-bin will convert to GET/cgi-bin.

Any /./path name insertions will be flattened. For example, GET/etc/./././passwd will be converted to GET/etc/passwd.

Any /../ path name insertions will be resolved. For example, GET /etc/abc/def/../../passwd will be converted to GET/etc/passwd.

To eliminate unnecessary overhead, this option should only be turned on for web log files. The conversion is unnecessary for regular log files.

Sample Screen

As mentioned earlier, FIG. 3 is an example of a security policy defined via the IDSPM web interface. In this screen sample, the messages file is being defined as part of a Solaris policy. It should be noted that the format field has one value that is currently %E. This is the simplest form of log parsing. The %E value instructs taking the entire log and treating it as one string of text. Because the messages log file is full of random log entries, it is difficult to pick a format to parse this data. If this file were something more regular such as an access_log or a sendmail log file, then it could be assumed that certain fields would always be valid. For example, in the access_log case, a default field could be selected to be the source IP. In this example, the SIP and DIP fields are blank.

SNMP Monitoring via Signatures

The HIDS sensor 20 allows signature libraries to be applied to SNMP resources much in the same way that they are applied to file content. Once an SNMP resource is defined in a security policy, the HIDS sensor 20 listens for incoming SNMP traps and examine each trap for the applied signature set. The following attributes are used to defined SNMP resources within a policy. A utility is provided (e.g., ./tools/catchTrap) that allows traps to be caught, parsed and displayed in much the same way that they will be caught and parsed within HIDS sensor 20. This allows traps to be examined prior to defining them within a security policy to verify that traps are being directed to the HIDS sensor host. It is also useful to verify the OID, Source IP and trap message to ensure that they match the expected values to be defined in the security policy. Note that the utility cannot be run concurrent with HIDS sensor 20. Two processes cannot be receiving traps concurrently.

Name

Specifies a name to be used for the SNMP source. The name specified is used to tie signatures back to an SNMP definition. Each name must be unique within a security policy amongst all definitions. The same name cannot be given to an SNMP and a file resource. Otherwise, the HIDS sensor 20 will not be able to associate signatures to the proper definition. Each signature library must be associated with a single SNMP definition. This allows signatures to be written for the specific record format associated with the SNMP resource.

OID

Each SNMP trap contains one or more object identifiers referred to as OIDs. The HIDS sensor 20 parses each OID from the trap to determine if it matches an SNMP resource definition in the security policy. The OID can be specified to limit the traps scanned for signatures to a specified OID value. Alternatively, the OID can be left blank to allow Squire to scan all traps for the applicable signatures. The HIDS sensor 20 uses a combination of the OID and IP specified to determine if the received SNMP trap matches the definition in the security policy prior to performing any signature matching.

IP

Specifies the source IP/CIDR for the trap. The list can include multiple combinations of IP addresses and CIDR blocks (each listed on a separate line). For example, SNMP Traps can be processed from 10.100.100.125 and 10.100.10.0/24 by listing the IP and CIDR block in the IP field. This field can be left blank to match SNMP traps from any IP/CIDRs for the specified OID. The HIDS sensor 20 uses the OID and IP information to determine if an SNMP trap matches the SNMP resource definition.

IP Type

SNMP Version 1 includes a Source IP address within its SNMP information. This may or may not match the actual Source IP address reported at the UDP level. The information supplied in the IP field can be specified as either UDP or SNMP addresses. Most likely, the UDP addresses will be specified. The IP Type must always be set to UDP when dealing with SNMP Version 2 Traps.

Format

The record format follows the same format outlined earlier under the File Content Monitoring via Signatures section.

Data Field

The data field follows the same format outlined earlier under the File Content Monitoring via Signatures section.

SIP

The SIP field follows the same format outlined earlier under the File Content Monitoring via Signatures section.

DIP

The DIP field follows the same format outlined earlier under the File Content Monitoring via Signatures section.

Web Convert

The Web Convert field follows the same format outlined earlier under the File Content Monitoring via Signatures section.

Microsoft Windows Event Log Monitoring via Signatures

The HIDS sensor 20 allows signature libraries to be applied to Microsoft Windows Event Log resources much in the same way that they are applied to file content. Once an event log resource is defined in a security policy, the HIDS sensor 20 monitors the event log for changes and examines each new entry for the applied signature set. For example, if auditing is enabled for the Administrator account, an entry will be added to the Security Event Log each time the Administrator successfully or unsuccessfully logs on/off of the system (based on the audit settings). The HIDS sensor 20 can be configured to look for this activity by defining the Security event log and writing a signature to look for the specific Administrator logon/logoff event in the event log. The following attributes are used to defined event log resources within a policy.

Each attribute that comprises the event log definition is defined below.

Name

Specifies a name to be used for the event log source. The name specified is used in event reporting and used in signatures to tag the signature back to an event log definition. To associate signatures to the proper resource definition, each name must be unique within a security policy among all definitions such that the same name cannot be given to an event log and a file resource. Each signature library must be associated with a single event log definition. This allows signatures to be written for the specific record format associated with the event log resource.

Windows Event Log

Specifies the actual name of the Windows Event Log on the host. The three typical event logs in use in Windows are: System, Security or Application. The name specified is used by the HIDS sensor 20 to open the event log and examine its contents for changes.

Format

A record format can be specified to parse each event log entry into distinct fields. This is useful when building signatures that need to search the event log entry for a pattern that is likely to be included in numerous places. If no record format is given, the entire record is treated as one large field (e.g., defaults to %E). The HIDS sensor 20 formats an event log entry similar to how the event log entry is displayed when it is clicked on in the Windows Event Viewer. The Windows Event Viewer displays an event by parsing the following fields: Date, Time, User, Computer, Event ID, Source, Type, Category and Description. For example, the Security Event Log shows an event entry as shown in FIG. 5. The HIDS sensor 20 formats each of the fields similar to the Event Viewer and then encloses each separate field in brackets (e.g., [ ]). The brackets help when specifying a record format such as (%B%B%B%B%B%B%B%B%E), where the eight %B tokens (FIG. 4) correspond to Fields 1–8 below and the %E token (FIG. 4) corresponds to Field 9 below. The corresponding record built by the HIDS sensor 20 is:

[10/24/00] [9:05:48 AM] [Administrator] [BASILISK] [528] [Security] [Success Audit] [Logon/Logoff] [Successful Logon: User Name: Administrator Domain: (0x0, 0x5FC9) . . . ]

Field 1: [10/24/00]
Field 2: [9:05:48 AM]
Field 3: [Administrator]
Field 4: [BASILISK]
Field 5: [528]
Field 6: [Security]
Field 7: [Success Audit]
Field 8: [Logon/Logoff]
Field 9: [Successful Logon: User Name: Administrator Domain: (0x0,0x5FC9). . .]

It should be noted that there are formatting differences between Windows NT 4.0 and Windows 2000 event logs. The HIDS sensor 20 consistently formats events as illustrated above. This is intentional to allow signatures to be written in a standard format. It should also be noted that the Description field will often contain tabs and spaces. The specific format of a Description field should be noted when developing a signature. When in doubt, it may be easier to specify two clauses to find two words in the Description field. In the example above, a signature '%9:User/20Name, %9:Administrator' may work better than trying to decipher if multiple spaces versus a tab was used to separate 'User Name: Administrator'. Thus, the HIDS sensor 20 is standardized to write signatures regardless of the operating system that generated the event.

Data Field

The data field follows the same format outlined earlier under the File Content Monitoring via Signatures section.

SIP

The SIP field follows the same format outlined earlier under the File Content Monitoring via Signatures section.

DIP

The DIP field follows the same format outlined earlier under the File Content Monitoring via Signatures section.

Web Convert

The Web Convert field follows the same format outlined earlier under the File Content Monitoring via Signatures section.

Microsoft Windows Registry Monitoring

The HIDS sensor 20 allows Windows Registry keys to be monitored for additions or changes. An event will be generated as changes are detected to the specified registry hive/key. Each attribute of the registry definition is defined below.

Name

Specifies a name to be used for the resource. The name used can be completely arbitrary. The name specified is used in event reporting. Each registry name must be unique within a security policy.

Registry Hive

The Windows registry is partitioned into groupings called hives. Choose the hive in the registry that contains the registry entry being defined. Valid choices are:

HKEY_LOCAL_MACHINE
HKEY_USER
HKEY_CURRENT_USER
HKEY_CLASSES_ROOT
HKEY_CURRENT_CONFIG

Key

Specify the registry key value to be monitored. The key name should be fully qualified (except for Registry Hive specified above) and include the necessary backslashes. For example, to specify the RunOnce registry key in the HKEY_LOCAL_MACHINE hive, the key should be specified as Software\Microsoft\Windows\CurrentVersion\RunOnce.

HIDS Sensor 20 Signature Format

Signatures are used to expand the detection abilities of the HIDS sensor 20. By default, all resource defined within a security policy are monitored for their defined activity (e.g., permission changes, MD5 hash changes, etc.). This monitoring can be greatly enhanced by defining signatures to scan a specified file for a specific signature pattern. If the pattern is found, an event is generated. A signature library is a grouping of signatures that all tie back to the same file definition. For example, if a security policy defines the /var/log/massages file as a resource named messages, a signature library can be created that is associated with the messages resource definition. Each signature comprises an Event Name, a Resource Definition, a Case Sensitive flag, one or more Search Clauses, and optional Override Settings. The Search Clause includes an optional Comparison Operator, an optional Field Number and a Search String. In its simplest form, the search clause contains only a search string. If the comparison operator is omitted from the search clause, the comparison will default to a string search. If the field number is omitted from the search clause, the comparison will be made against the first field. Multiple search clauses can be specified by separating each clause with a comma. There is no limit to the number of search clauses that can be chained together in a signature. The search clause format is illustrated in FIG. 6.

Figure 7:
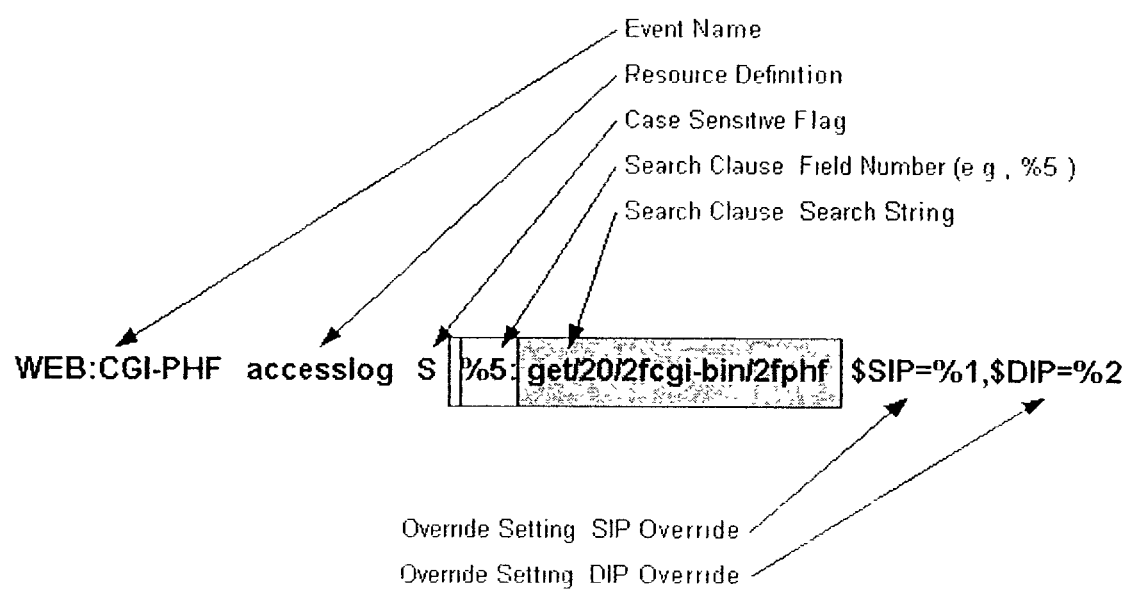
FIG. 7 depicts a sample signature.

FIG. 7 is an example signature that searches for the cgi-bin phf attack. It implies that the Apache access log has been defined as accesslog in a security policy. Also implied is that the resource definition specifies a record format that parses the record so that the fifth field (e.g., %5:) is the actual GET string. Note that only one search clause is specified in the example and that the comparison operator has been omitted from the search clause.

Event Name

The name of the signature that the HIDS sensor 20 is searching for is expressed as a string. Event names should only contain alphanumeric characters (e.g., 0–9, A–Z, a–z), colons, underscores and hyphens. All other special characters should be avoided because these other special characters tend to be ambiguous to other software applications. Event names have a maximum length of 30 characters. When defining an event name, this maximum should not be exceeded. The dsquire.sigs examples have a loose organization to naming attacks, but there is no reason why these cannot be modified. The above example uses a name of WEB:CGI-PHF. The event name could have just as easily been set to STUPID-WEB-HACK-PHF or PHF-SCRIPT-KIDDY.

Resource Definition

This field is used to tie the signature back to a resource definition within the security policy (e.g., Resource Definition File). As security policies are created, files are defined with an arbitrary file name (e.g., accesslog), a full path to the file (e.g., /var/log/httpd/accesslog) and optionally a record format (e.g., %i%s%s%B%Q%n%n).

Signatures are written specifically for a given resource definition.

Case Sensitive

Search strings can be case insensitive for the printable character range. For example, most web servers will respond to 'GET' requests as well as 'get' requests. The HIDS sensor 20 could use two different rules to search for this, but there is a better way. By specifying an 'S' as the third argument (or clicking No on the Case Sensitive radio button in the GUI), Squire will search for all cases of the string regardless of upper or lower case characters. To use binary comparison, specify a 'B' (or click Yes on the Case Sensitive radio button in the GUI). This will search for an exact match of the search string.

Search Clause: Comparison Operator:

By default, comparisons are performed as string searches. The resource data is scanned to determine if the search string is contained within the data. This comparison can be altered by including a comparison operator to the front of any search clause. FIG. 8 sets forth the comparison operators that are available:

Search Clause: Field Number

Depending on the file definition within a security policy, field numbers may or may not be required. For example, if a file is defined without a record format, the entire record is considered to be one large field (field number %1:). In this case, the Search Clause does not need to specify a field number. If a record format is defined for a file, field numbers are required. The field number is used to identify in which parsed field the SEARCH STRING should appear. For example, if a record format is specified as (%s%s%s%s), the record will be parsed into four fields separated within the record by spaces. Valid field numbers will be 1–4 specified as '%1:', '%2:', '%3:' and '%4:'. If the SEARCH STRING does not include field numbers, the HIDS sensor 20 assumes that field 1 should be searched.

For example, the following signatures are identical:
%1:this-is-a-test-pattern
this-is-a-test-pattern However, field numbers allow signatures to reduce false positives and increase accuracy. If a search pattern is likely to occur in several locations within a record, field numbers enable the search to occur in the proper location. For example, when searching an Apache access log for error 404, the 404 may occur elsewhere in the log record. A record format could be specified in the file definition within a security policy such that the error code is parsed as a standalone field (e.g., %i%s%s%B%Q%n%n). This results in the error code being parsed as the sixth field in the record. As the result, the error code field can be searched for 404 as follows:

%6:404

Search Clause: Search String

The HIDS sensor 20 has several string definition features which allow for creation of powerful, yet efficient, pattern searches. The most basic string definition is to simply type a string of letters and numbers without any spaces such as this:
This-is-a-test-string
%3:This-is-a-test-string The first example is lacking a field number and would result in searching the first field for 'This-is-a-test-string'. The second example would perform its search on the third field in the specified file. The search string isn't very useful because we can't specify any non-printable characters like carriage returns or null bytes. To get around this, the '/' character can be used as an escape character to specify two alphanumeric values which represent a hex number. The hex ASCII code for '–' is 0x2d which means that the above example could be represented like:

This/2dis/2da/2dtest/2dstring

In order to search for a '/' character, simply use the hex value for '/' which is 0x2f. Here is a string that searches for "/cgi-bin/phf":

/2fcgi-bin/2fphf

To drive the point home, the 0x20 character can be used to represent a space. Here is "see spot run" followed by a newline.

see/20spot/20run/0a

It should be noted that since field numbers require the use of '%' and ':' (e.g., '%4:'), hex values must be used to specify a search pattern with embedded '%' and ':' characters. To search for '%:' the following pattern could be used:

/25/3a

Wild Cards

There are four available wildcard characters. These are the question mark, the pound sign, the dollar sign and the asterisk. All wildcards represent a single byte that may be used to represent the following ranges:
?—Any byte
*—Any printable character
$—Any nonprintable character
—Any number Because of this protocol, attempting to search for these bytes (?,*,$,#) in normal traffic requires that the corresponding hex escape code be used. Here is a table for quick access:
?—0x3f
*—0x2a
$—0x24
—0x23

For example, the question mark can be used as a single character wildcard. This wildcard will match anything regardless of what the value is. Something has to be there though. If the amount of captured data ends before a wildcard matches, then no match occurs. To search for a question mark, use the hex code of 0x3f. Here is the above example where "spot" is replaced with any four-letter word.

see/20????/20run/0a

Multiple Search Clauses

As previously mentioned, multiple search clauses can be specified within a signature. There is no limit to the number of clauses that can be specified. Each search clause is separated from the next with a comma. To search for the pattern "see/20" in the third field and then the pattern "/20run/0a" in the fourth field, the signature syntax would be as follows:

%3:see/20,%4:run/0a

This is very useful as one could write a signature which looks for any "/cgi-bin/" query followed by interesting keywords such as "/etc/passwd", "/bin/mail" or "xterm-d ???". Here are these examples in the HIDS sensor 20 signature format:
%4:/2fcgi-bin/2f,%4:/2fetc/2fpasswd
%4:/2fcgi-bin/2f,%4:/2fbin/2fmail
%4:/2fcgi-bin/2f,%4:xterm/20-d???

Negative Signatures

Negative signatures allow for events to be triggered if a search pattern is not contained within a field. Negative signatures are written by setting the comparison operator in the search clause to '!'. A good example of this would be to identify PHF attacks against a web server as successful if the error code returned by httpd was not in the 400 range. If the Apache access log was defined as follows in a security policy:

Sample Data:
127.0.0.1—[13/Jul/2000:16:29:28-0400] "get /cgi-bin/phf" 401—

Record Format:
%i%s%s%B%Q%n%n
%i—IP Address. Parsed as '127.0.0.1'
%s—Space terminated field. Parsed as '-'
%s—Space terminated field. Parsed as '-'
%B—Field enclosed in brackets. Parsed as '[13/Jul/2000: 16:29:28-0400]'
%Q—Field enclosed in Quotes. Parsed as '"get /cgi-bin/phf"'
%n—Number Field. Parsed as '401'
%n—Number Field. Parsed as '-'

Then a negative signature can be written to scan field 5 for /cgi-bin/phf and field 6 to not be in the 400 range. This signature would be written as follows:
%5:/2fcgi-bin/2fphf,!%6:4##

Numeric Signatures

Signatures can be written to test fields to determine if their value is less than, greater than or equal to a specific number. This can be helpful when parsing logs to determine if the activity in the log is for a particular TCP Port number. With normal signatures, it is not possible to search for a particular port number (e.g., 22—SSH). The signature would match on anything that contained the pattern '22' (e.g., '22', '1220'). A numeric signature allows the parsed field to be treated as a number prior to the comparison. Numeric signatures are written by specifying a '<', '=' or '>' as the Comparison Operator in the search clause. For example, to write a signature to find log entries where the sixth field is equal to '22' and the seventh field is greater than '1024', the following signature can be written:
=%6:22,>%7:1024

OR Logic

Signatures can include OR logic to search for multiple patterns. Any Search pattern can include the OR symbol (e.g., |) to specify that the HIDS sensor 20 should match on either of the specified patterns. There is no limit to the number of clauses that can be chained together within a search pattern. For example, to search for someone trying to retrieve either the /etc/services file, /etc/hosts file or the /etc/passwd file, the following signature can be written:
%5:get,%5: passwd|services|hosts Override SIP/DIP Normally, to parse a Source IP Address (SIP) or Destination IP Address (DIP), the field locations can be identified via the 'SIP Field' and 'DIP Field' in the file definition within a security policy. There are times when the SIP and DIP may appear in varying field locations based on the subsystem that logged the entry into the file being parsed. In these instances, the SIP/DIP locations can be overridden on a per signature basis. To do so, specify the SIP/DIP field number following the signature pattern. For example, to override the SIP with field 4 and the DIP with field 6, the following signature can be used:
%5:get,%5:passwd|services $SIP=%4,$DIP=%6

The SIP is specified by including a '$SIP=' attribute followed by the field number to be used. The DIP is specified by including a '$DIP=' attribute followed by the field number. A SIP can be specified without a DIP, a DIP can be specified without a SIP, or both can be specified in any order. The field numbers are based on the record format specified for the file being parsed. To disregard the record format, and specify field numbers based on space separated fields; use the same syntax without the percent sign ('%') preceding the field number. For example, the following signature will override the SIP with the fifth space-separated field in the record regardless of how the record format is specified:
%5: get,%5:passwd|services $SIP=5

Override Format

Normally, the record format is specified as part of the resource definition in the security policy. The record format can be overridden on a signature basis by using the $FORMAT=%E clause. This allows a special record format to be used as the signature is tested. This can be useful when dealing with log files that consolidate several different record formats into a single file. No single record format can be applied to the file in whole. Instead, an individual format must be tied to each signature as it is tested. An example format override is listed on the following signature:
%5:get,%5:passwd|services $SIP=%4,$DIP=%5, $FORMAT=%I%s%s%B%Q%n%n HIDS Sensor 20 Configuration Files The HIDS sensor 20 utilizes three configuration files located in the ./conf subdirectory. The Module Definition File (e.g., dsquire.cfg) is used by the HIDS sensor 20 to identify which modules have been enabled and to physically locate the modules. The Resource Definition File and the Signature Definition File (e.g., dsquire.net and dsquire.sigs) are used by many of the Enterasys modules to determine which settings have been activated. The following section further describes each of the configuration files.

Module Definition File: dsquire.cfg

The Module Definition File is used to inform the HIDS sensor 20 of each of the modules that should be activated within each of the engines. The file has three sections (e.g., EventDetectionEngine, EventFilterEngine and EventAlertingEngine). Each section includes one or more stanzas for the modules configured within the engine. FIGS. 9A–9B specify the attributes that are used to define a module. These attributes represent all possible attributes that can be used to define a module.

FIG. 10 specifies the tokens which can be used to build EventFormats in the Module Definition file.

FIGS. 11A–11C are a sample configuration of the HIDS sensor 20, namely, a sample module definition file. The initial section (e.g., SensorName, LogFileName) lists attributes that are common to all modules of the HIDS sensor 20. The SensorName, LogFileName and Debug settings are made available to each module as they are initialized. A section exists for each engine (e.g., EventDetectionEngine, EventAlertingEngine, EventFilterEngine). Module definitions are added to the appropriate engine. For example, to add an EDE module, a new stanza should be added to the EventDetectionEngine section. The name preceding the stanza can be any unique identifier and is only used by the HIDS sensor 20 to distinguish between stanza definitions.

Resource Definition File: dsquire.net

The Resource Definition File is used by Enterasys modules to define resources on the local machine which should be monitored. For example, a definition can be added to monitor a disk file resource to alert if the MD5 hash has changed. As the HIDS sensor 20 starts each Enterasys module, the modules examine this file to determine their workload. For example, as the MD5Detection module initializes, it parses this config file and monitors any resources with the REPORT MD5_CHECKSUM attribute set. If no files are marked with REPORT MD5_CHECKSUM, the module will terminate. It should be noted that in many of the Enterasys module definitions in dsquire.cfg, the ConfigFile attribute points to this configuration file. The Resource Definition File is built automatically by setting attributes via the Update Net File screen in the IDSPM GUI. It is helpful to understand this file format if the HIDS sensor 20 is to be manually configured. FIGS. 12A–12D are an example of a dsquire.net file:

Signature Definition File: dsquire.sigs

The Signature Definition File contains signatures for resources defined in the Resource Definition File. This allows the contents of a disk file, SNMP Trap or Windows Event Log entry to be scanned for specific character patterns. An example would be to scan the Windows System Event Log to detect when the Checkpoint Firewall service starts. This example is illustrated by the CHECKPOINT: START signature in dsquire.sigs and the EvtLog-System resource defined in dsquire.net. Note that the signature is tied back to a resource via the FILE_NAME attribute in dsquire.net. The Signature Definition File is typically built automatically by defining signatures via the Update Signature File screen in the DPM GUI. It is helpful to understand this file format if the HIDS sensor 20 is to be manually configured. FIGS. 13A–13B are a sample Signature Definition File.

While this invention has been particularly shown and described with references to preferred embodiments thereof, it will be understood by those skilled in the art that various changes in form and details may be made therein without departing from the spirit and scope of the invention as defined by the appended claims.

I claim:

1. A computer-readable medium having computer-executable instructions for performing intrusion detection of a computer network having at least one host computer coupled thereto, said computer-readable medium being loadable on the at least one host computer, said computer-readable medium comprising:

an array of event processing means wherein each one of said event processing means runs concurrently without impeding each other's performance, said array of event processing means monitoring resources on the at least one host computer or monitoring activity forwarded to the at least one host computer via the computer network and generating event data corresponding to said monitoring;

an event filter engine for filtering all event data from said array of event processing means, said event filter engine either altering the contents of the event data to form filtered event data or discarding the event data, said event filter engine altering the contents of the event data by altering an event data name based on a source network address related to said event data, said event filter engine comprising a plurality of configured modules and wherein said event filter engine passes all event data through said configured modules serially; and an event alerting engine for generating alerts based on said filtered event data or forwarding said filtered event data to a destination, and wherein said event alerting engine comprises a second plurality of configured modules and wherein each of said second plurality of configured modules receives all of said filtered event data.

2. The computer-readable medium of claim 1 wherein each of said second plurality of configured modules comprises a dynamically-linked module.

3. The computer-readable medium of claim 1 wherein any one of said second plurality of configured modules comprises simple scripts.

4. The computer-readable medium of claim 1 wherein one of said second plurality of configured modules is a ring buffer alert module for providing an event flow processor with said filtered data to report said filtered event data.

5. The computer-readable medium of claim 1 wherein one of said second plurality of configured modules is a replication agent alerting module for providing an event flow processor with said filtered data to report said filtered event data.

6. The computer-readable medium of claim 1 wherein one of said second plurality of configured modules is a database alerting module for recording said filtered event data in an intrusion system database.

7. The computer-readable medium of claim 1 wherein one of said second plurality of configured modules is an export log alerting module for generating a local export log of said filtered event data.

8. The computer-readable medium of claim 1 wherein one of said second plurality of configured modules is an SNMP trap alerting module for generating alerts based on events that are detected.

9. The computer-readable medium of claim 1 wherein one of said second plurality of configured modules is a hex dump alerting module for displaying events on a monitor as the events occur.

10. A method for efficiently managing and reporting intrusion, or attempted intrusion, events of a computer network, said method comprising the steps of:

(a) providing an array of event processing means on a host computer, coupled to the computer network, that operate concurrently without impeding each other's performance, each of said event processing means detecting a corresponding event related to intrusion, or intrusion attempts, to form event data;

(b) passing said event data to a plurality of configured modules on the host computer, in serial fashion, that alter the contents of said event data that is to be reported to form filtered event data or that discard said event data not considered of value to report; and (c) passing all of said filtered event data to a second plurality of configured modules for providing notification of the intrusion or intrusion attempts.

11. The method of claim 10 wherein said step of providing an array of event processing means comprises monitoring an MD5 checksum of files.

12. The method of claim 10 wherein said step of providing an array of event processing means comprises monitoring file attributes.

13. The method of claim 10 wherein said step of providing an array of event processing means comprises monitoring signature patterns in the content of file logs.

14. The method of claim 10 wherein said step of providing an array of event processing means comprises monitoring SNMP traps using signatures.

15. The method of claim 10 wherein the host computer comprises an operating system and wherein said step of providing an array of event processing means comprises monitoring TCP/IP service requests that interact with the operating system.

16. The method of claim 10 wherein the host computer comprises an operating system and wherein said step of providing an array of event processing means comprises monitoring the kernel of the operating system.

17. The method of claim 10 wherein the host computer comprises an operating system and wherein said step of providing an array of event processing means comprises monitoring the event log using signatures.

18. The method of claim 10 wherein the host computer comprises an operating system and wherein said step of providing an array of event processing means comprises monitoring the event registry.

19. The method of claim 10 wherein said step of altering the contents of said event data that is to be reported to form filtered event data comprises altering the name of event data based on a source network address related to said event data.

20. The method of claim 10 wherein said step of passing all of said filtered event data to a second plurality of configured modules comprises providing notification providing an event flow processor with said filtered data to report said filtered event data.

21. The method of claim 10 wherein said step of passing all of said filtered event data to a second plurality of configured modules comprises recording said filtered event data in an intrusion system database.

22. The method of claim 10 wherein said step of passing all of said filtered event data to a second plurality of configured modules comprises generating a local export log of said filtered event data.

23. The method of claim 10 wherein said step of passing all of said filtered event data to a second plurality of configured modules comprises generating alerts based on events that are detected.

24. The method of claim 10 wherein said step of passing all of said filtered event data to a second plurality of configured modules comprises displaying events on a monitor as the events occur.

* * * * *